(12) United States Patent
Smith

(10) Patent No.: US 8,247,918 B2
(45) Date of Patent: Aug. 21, 2012

(54) POWER GENERATION COUPLER

(75) Inventor: Danny J. Smith, Wheatland, WY (US)

(73) Assignee: Airgenesis LLC, Wheatland, WY (US)

( * ) Notice: Subject to any disclaimer, the term of this patent is extended or adjusted under 35 U.S.C. 154(b) by 0 days.

(21) Appl. No.: 13/437,642

(22) Filed: Apr. 2, 2012

(65) Prior Publication Data

US 2012/0190497 A1    Jul. 26, 2012

Related U.S. Application Data

(63) Continuation of application No. 12/918,705, filed as application No. PCT/US2010/029077 on Mar. 29, 2010, now Pat. No. 8,178,991.

(60) Provisional application No. 61/251,844, filed on Oct. 15, 2009.

(51) Int. Cl.
*F03D 9/00*    (2006.01)
(52) U.S. Cl. .......................... 290/44; 290/55
(58) Field of Classification Search ............. 290/43, 290/44, 54, 55; 415/4.3
See application file for complete search history.

(56) References Cited

U.S. PATENT DOCUMENTS

| | | | |
|---|---|---|---|
| 3,944,840 A | 3/1976 | Troll |
| 4,171,491 A | 10/1979 | Theyse |
| 4,220,870 A | 9/1980 | Kelly |
| 4,285,481 A | 8/1981 | Biscomb |
| 4,585,950 A | 4/1986 | Land |
| 5,051,018 A | 9/1991 | Appell et al. |
| 5,182,458 A | 1/1993 | McConachy |
| 5,394,016 A | 2/1995 | Hickey |
| 5,680,032 A | 10/1997 | Pena |
| 5,798,632 A | 8/1998 | Muljadi |
| 5,876,181 A | 3/1999 | Shin |
| 6,191,496 B1 | 2/2001 | Elder |
| 6,585,553 B1 | 7/2003 | Fetridge et al. |
| 6,726,439 B2 | 4/2004 | Mikhail et al. |
| 6,951,443 B1 | 10/2005 | Blakemore |
| 6,984,899 B1 | 1/2006 | Rice |

(Continued)

FOREIGN PATENT DOCUMENTS

EP    0602625 A1    6/1994

(Continued)

OTHER PUBLICATIONS

International Patent No. PCT/US2010/029077, International Search Report dated Jul. 30, 2010.

(Continued)

*Primary Examiner* — Nicholas Ponomarenko
(74) *Attorney, Agent, or Firm* — Santangelo Law Offices, P.C.

(57) ABSTRACT

The inventive technology described herein generally relates to the field of power generation. More specifically, methods and apparatus for a power generation coupler utilizing perhaps multiple generators coupled through a power generation coupler to at least one rotational movement element such that said coupled connection is dynamically movable across the surface the rotational movement element so as to maintain an electrical output at a constant generator rotation(s) per minute (RPM) according to the varying rotational velocity along the radius of a rotational movement element. In some embodiments such coupled generators may be sequentially loaded and disengaged to such rotational movement element to maintain an electrical output at a constant generator RPM. Certain embodiments may include a static power generation coupler as well as an electrically dynamic power generation coupler such that the current applied to the stator of a generator may dynamically alter that generators resistance.

22 Claims, 12 Drawing Sheets

U.S. PATENT DOCUMENTS

| | | |
|---|---|---|
| 7,095,129 B2 | 8/2006 | Moroz |
| 7,098,553 B2 | 8/2006 | Wiegel et al. |
| 7,215,037 B2 | 5/2007 | Scalzi |
| 7,215,039 B2 | 5/2007 | Zambrano et al. |
| 7,298,059 B2 | 11/2007 | Delmerico et al. |
| 7,375,436 B1 * | 5/2008 | Goldin .............. 290/42 |
| 7,425,776 B2 | 9/2008 | Ketcham |
| 7,432,608 B2 | 10/2008 | Okubo et al. |
| 8,178,991 B2 * | 5/2012 | Smith .............. 290/55 |
| 2002/0070558 A1 | 6/2002 | Johann |
| 2003/0057703 A1 | 3/2003 | Howes et al. |
| 2004/0086373 A1 | 5/2004 | Page, Jr. |
| 2004/0096327 A1 * | 5/2004 | Appa et al. .............. 416/1 |
| 2005/0084373 A1 | 4/2005 | Suzuki |
| 2005/0280264 A1 | 12/2005 | Nagy |
| 2006/0055175 A1 | 3/2006 | Grinblat |
| 2006/0108809 A1 | 5/2006 | Scalzi |
| 2006/0188364 A1 | 8/2006 | Fritz |
| 2006/0278445 A1 | 12/2006 | Chang |
| 2007/0067067 A1 | 3/2007 | Stommel |
| 2007/0245728 A1 | 10/2007 | Duong |
| 2008/0150294 A1 | 6/2008 | Jones |
| 2008/0257614 A1 | 10/2008 | Tabe |
| 2008/0263731 A1 | 10/2008 | Tabe |
| 2009/0146423 A1 | 6/2009 | Arinaga |
| 2009/0167028 A1 | 7/2009 | Akamine |
| 2011/0133483 A1 | 6/2011 | Yoneda et al. |
| 2011/0135470 A1 | 6/2011 | Merkel |
| 2011/0135471 A1 | 6/2011 | Wangford |
| 2011/0135493 A1 | 6/2011 | Nies et al. |
| 2011/0137586 A1 | 6/2011 | Jiang et al. |
| 2011/0223017 A1 | 9/2011 | Smith |

FOREIGN PATENT DOCUMENTS

| | | |
|---|---|---|
| EP | 1010891 A1 | 6/2000 |
| EP | 2085650 A2 | 8/2009 |
| EP | 2109210 A2 | 10/2009 |
| JP | 59138781 A2 | 8/1984 |
| JP | 60002048 A2 | 1/1985 |
| JP | 60259772 A2 | 12/1985 |
| JP | 61240900 A2 | 10/1986 |
| JP | 63289270 A2 | 11/1988 |
| JP | 2001339995 A2 | 12/2001 |
| JP | 2001339996 A2 | 12/2001 |
| JP | 2002130110 A2 | 5/2002 |
| JP | 2002155850 A2 | 5/2002 |
| JP | 2003134794 A2 | 5/2003 |
| JP | 2004260929 A2 | 9/2004 |
| WO | 9853544 | 11/1998 |
| WO | 2011046632 A1 | 4/2001 |
| WO | 03017449 A2 | 2/2003 |
| WO | 2006073590 A2 | 7/2006 |
| WO | 2008037004 A1 | 4/2009 |
| WO | 2009134115 A2 | 11/2009 |
| WO | 2009141148 A2 | 11/2009 |
| WO | 2009142477 A1 | 11/2009 |

OTHER PUBLICATIONS

International Patent No. PCT/US2010/029077, Written Opinion of the International Searching Authority dated Jul. 30, 2010.

Nayef, N. et al. Friction Drive, Variable Speed, Multiple Generator, Utility-Scale Wind Turbine, CWind Inc. Paper for WWEC2008.

U.S. Appl. No. 12/918,705, filed Aug. 19, 2010.

* cited by examiner

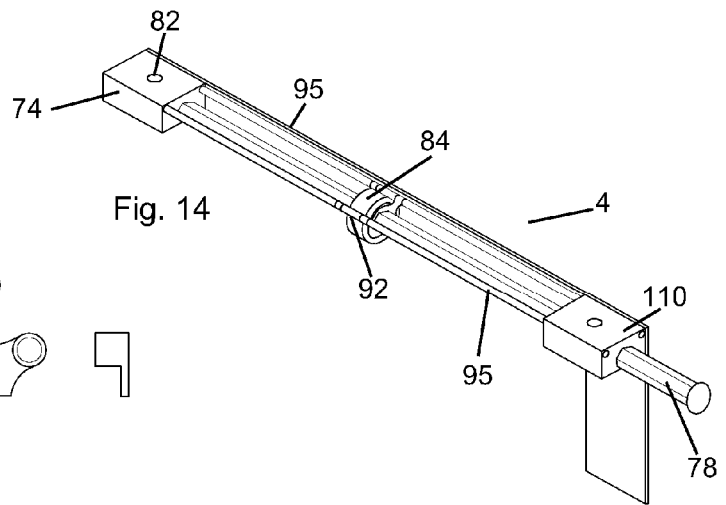
Fig. 14
Fig. 15
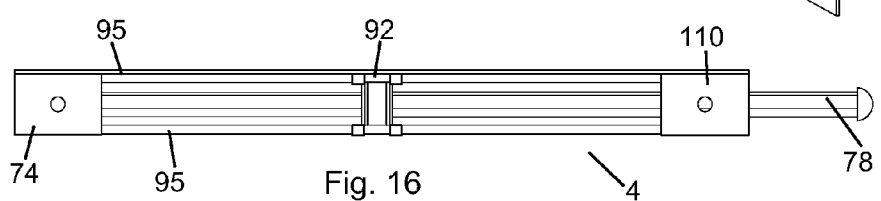
Fig. 16
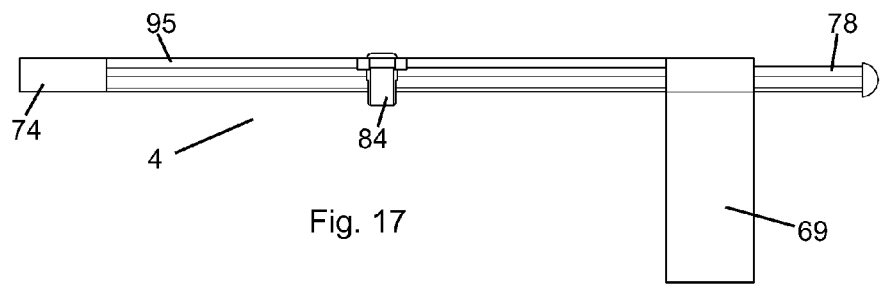
Fig. 17
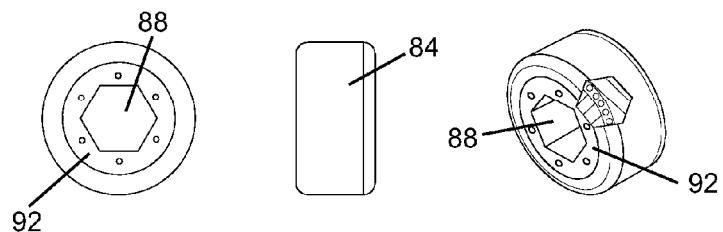
Fig. 18

POWER GENERATION COUPLER

This application is a continuation application which claims the benefit of and priority to application Ser. No. 12/918,705, filed Aug. 20, 2010, which itself is the United States National Stage of International Application No. PCT/US2010/029077, filed Mar. 29, 2010 which claims the benefit of and priority to U.S. Provisional Application No. 61/251,844, filed on Oct. 15, 2009. The entire specification and figures of the above-mentioned applications are hereby incorporated, in their entirety by reference.

TECHNICAL FIELD

The inventive technology described herein generally relates to the field of renewable energy production and/or more particularly wind power generation. More specifically, methods and apparatus for wind power generation utilizing perhaps multiple generators coupled to a continuum and sequentially controlled so as to maintain an electrical output at a constant generator rotation(s) per minute (RPM). The inventive technology may be particularly suited to accomplishing such wind power generation across a broad range of wind and turbine rotational velocities.

In particular, the current inventive technology may efficiently generate a constant electrical output at low wind velocities where traditional wind power generation systems cannot practically operate, as well as generating a constant electrical output at high wind velocities, again where traditional wind generation systems cannot practically operate so as to be superior to known wind generation systems. The inventive technology may be particularly suited to the field of establishing multiple wind power generation systems into wind farms located in areas with constant amounts of wind and may further be connected to a local or national electrical grid system.

BACKGROUND

Humans have been harnessing the wind for thousands of years. Wind energy currently represents one of the most plentiful renewable resources on the planet. In recent decades as demand for additional sources of energy has increased, wind power has emerged as a clean, environmentally sustainable, renewable source of energy essential to the world's growing economy. Traditionally, wind energy has been captured and converted into usable electricity through the use of large wind turbines that drive a corresponding electrical generator. In most cases a plurality of wind turbines are placed strategically in an area of high and constant wind creating modern wind farms.

In a traditional wind power generation system, a generator is mounted onto a large tower that is erected to a sufficient height so as to capture wind energy to rotate a turbine. The rotation of this turbine is used to rotate a rotor placed in proximity to a stator which, when a magnetic field is applied generates an electrical current that may be diverted to a grid or used for other work. Traditional wind power generation systems typically use conventional gear configurations to "gear up" or "gear down" the system in response to varying wind velocities. While traditional systems have been employed commercially to some limited success, there are significant drawbacks to these systems. First, many commercially available traditional wind capture systems utilize only a single large generator mounted on top of a large tower, sometime in excess of 200 feet and may weigh as much as 150 tons. Despite the obvious problems of construction and weight distribution, as well as the disadvantages of having such a large single generator placed in an elevated position, maintenance is complicated in such a configuration. In addition, with only a single generator, any mechanical or other failure may result in the entire traditional wind power generation system needing to be deactivated while repairs are made.

Another drawback of traditional systems is that they often cannot operate at low or high wind speeds and as a result have a limited turbine RPM where they may operate. At low wind speeds traditional wind turbine generators often cannot generate enough mechanical power to innervate a single large generator. Typically, traditional wind turbine systems need to achieve at least 12 RPM to begin generating an electrical output. Below this RPM level such traditional wind turbine systems cannot generate sufficient mechanical energy to innervate such a large single generator efficiently and therefore generally need to maintain the generator in a disengaged position.

Conversely, traditional wind turbine systems often cannot efficiently operate during high wind conditions. Typically, traditional wind turbine systems often cannot exceed 20 blade RPM, which represents a limiting upper threshold. Under such high wind conditions, the mechanical energy generated from the rotating turbine can exceed the generator's capacity to operate effectively and may need to be disengaged. Traditional wind turbine systems can have conventional gearing systems to accommodate changes in wind velocity. Despite this they can be mechanically limited in the range of wind velocities where they can effectively operate. This in turn limits their operational efficiency and ultimately their overall commercial value. Furthermore, traditional wind turbine systems often need to be shut down as often as twice per week to be cleaned and maintained. This extended and complex maintenance further reduces the economic viability and reliability of traditional wind turbine systems.

Another drawback of traditional systems is that in addition to being limited in their range of operation, electrical output and mechanical design, they can be prohibitively expensive in relation to the amount of actual usable electricity produced. As discussed previously, traditional systems can only be operable within a narrow window of available wind energy to drive the generator. For example, traditional wind power generation systems may contain a single 1.5 MW generator that produces 900 kilowatts (KW) at a blade speed of 12 RPM, and 1.5 MW at a blade speed of 20 RPM. Despite the need for additional energy sources, and despite the plentiful and ubiquitous nature of wind energy, this level of commercial wind power generation as compared to other more traditional methods such as hydroelectric and coal fired plants has not yet proved economically feasible on a large scale. Furthermore, traditional wind turbine systems can require large amounts of initial capital and manufacturing resources and, as discussed above can be limited in the amount, range and reliability of their wind powered electrical generation.

The foregoing technological and economic limitations associated with traditional wind power generation systems as well as wind power generation techniques associated with said systems may represent a long-felt need for a comprehensive, economical and effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges identified herein. These attempts may even have led away from the technical directions taken by the present inventive technology and may even result in the achievements of the present inventive technology being considered to some degree an unexpected result of the approach taken by some in the field.

Accordingly, there is a need within the field for an efficient and economically viable wind power generation system that addresses each of the technological and economic limitations outlined above. The inventive technology disclosed in this application represents a significant leap forward in the field of power generation and power generation systems.

The wind power generation systems discussed in this application among other attributes allows for generator control at the coupler level thereby allowing for constant generator RPM and electrical output at variable wind velocities, as well as constant generator output and RPM at wind velocities below and above traditional wind velocity thresholds. In addition, embodiments of the current inventive technology allow for increased and efficient sequential multi-generator wind energy capture at low turbine rotational RPM. Various embodiments of the current innovative technology may provide methods and apparatus for a wind power generation system wherein multiple generators are controlled and sequentially loaded and possibly adjusted along a continuum by a continuum coupler. Additional embodiments may include a radius adjustable coupler. Additional embodiments may include methods and apparatus for continuum coupling multiple generators to a rotational element such that said generator's electrical output, and RPM are controllably maintained thereby outputting a constant electrical output as well as increasing the overall efficiency of wind capture and energy conversion as well as increasing the range of wind velocities wherein sufficient wind energy may be captured to produce an electrical output.

DISCLOSURE OF INVENTION(S)

The present invention presents elements that can be implemented in various embodiments. Generally a goal of the present inventive technology is to provide, utilizing advancements in design, construction, assembly, materials, wind power generation and other characteristics to provide a wind power generation system that is superior to traditional wind power generation systems. These improvements will be taken up in detail as they are presented in the claims.

Accordingly, the present invention includes a variety of aspects, which may be combined in different ways. The following descriptions are provided to list elements and describe some of the embodiments of the present invention. These elements are listed with initial and in some cases secondary or multiple embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application. Accordingly, the objects of the methods and apparatus for a wind power generation system described herein address each of the foregoing in a practical manner. Naturally, further objects of the inventive technology will become apparent from the description and drawings below.

One, of the many objectives of the current inventive technology is to provide a wind power generation system that coupler controls the electrical output, generator RPM as well as other operational characteristics and the like.

Another objective of the current inventive technology is to provide a wind power generation system that is approximately 80% more efficient than many current commercially available wind power generation systems.

Another objective of the current inventive technology is to provide a wind power generation system continuum coupler that may sequentially engage and adjust multiple generators to efficiently and optimally produce an electrical output while maintaining constant generator RPM regardless of wind velocity.

Another objective of the current inventive technology is to provide a wind power generation system that provides sufficient electrical output so as to reduce the number of individual wind power generators that are required per each wind farm to compete with other power generation methods such a hydroelectric power generation and coal fired power generation.

Another objective of the current inventive technology is to provide a wind power generation system that may efficiently operate at a variety of wind velocities outside traditional wind power generation systems operational thresholds.

Another objective of the current inventive technology is to provide a wind power generation system that may efficiently operate within a low turbine RPM range.

Another objective of the current inventive technology is to efficiently and optimally generate commercially useful electrical output for a fraction of the cost of traditional wind power generation systems.

Another objective of the current inventive technology is to provide a wind power generation system that may continue generating an electrical output even while repairs and maintenance are performed. Naturally these and other aspects and goals are discussed in the following specification and claims.

BRIEF DESCRIPTION OF DRAWINGS

FIG. 14: is a perspective view of a radius adjustable coupler in one embodiment thereof.

FIG. 15: is a front view of a portion of a non-rotational gyrator support element showing two radius adjustable coupler drive shaft track connection apertures in one embodiment thereof.

FIG. 16: is a top view of a radius adjustable coupler with detail on a gyrator, radius adjustable coupler drive shaft track and generator drive shaft in one embodiment thereof.

FIG. 17: is a top view of a radius adjustable coupler with detail on a gyrator, radius adjustable coupler drive shaft track and generator drive shaft in one embodiment thereof.

FIG. 18: is a front side and perspective view of a gyrator element in one embodiment thereof.

MODE(S) FOR CARRYING OUT THE INVENTION(S)

Figure 1:
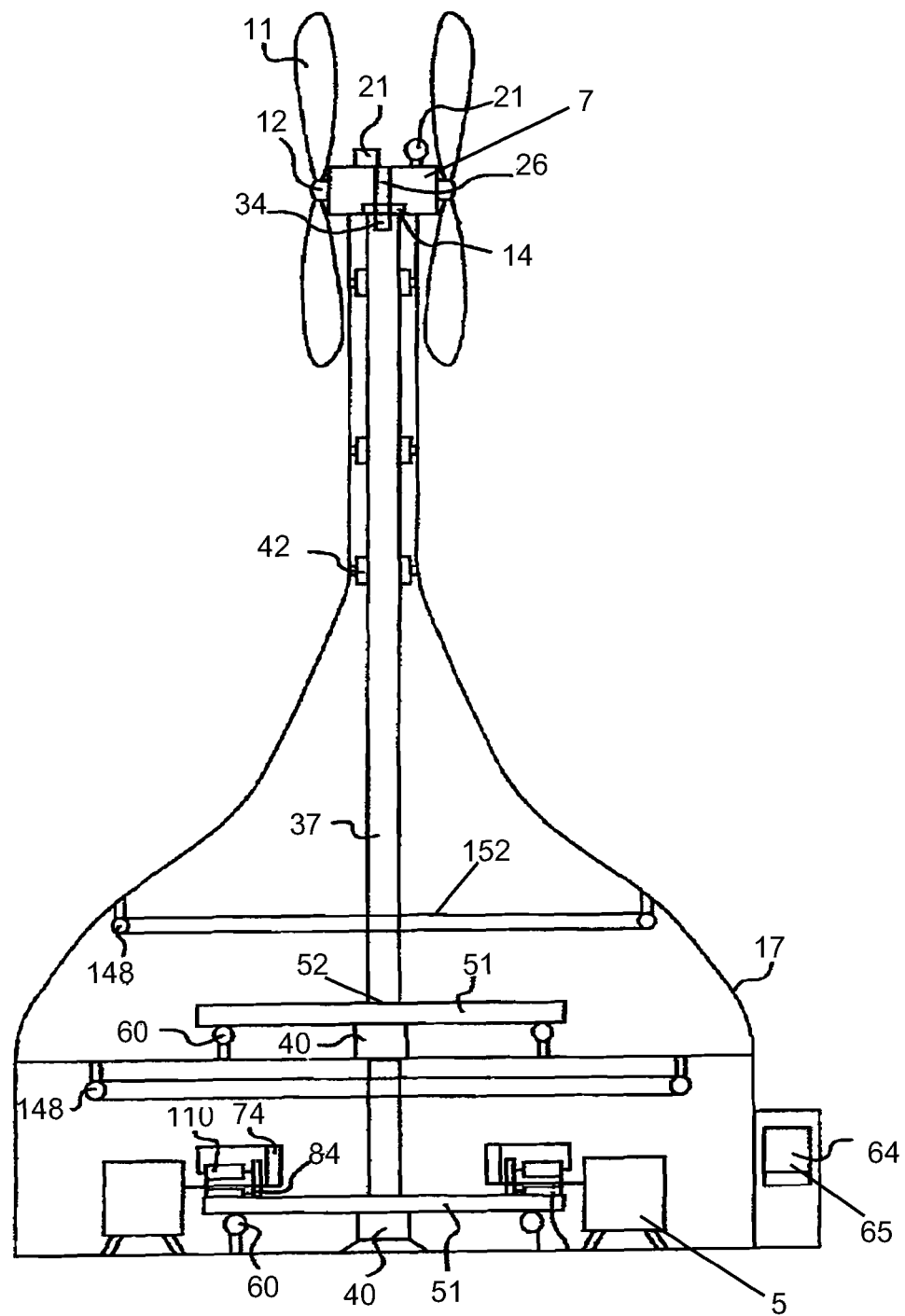
FIG. 1: is a cross-section view of a wind power generation system in one embodiment.

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application. With all embodiment (whether methods and apparatus) that entail at least one coupler, or the step of coupling, as well as control, controlling, sensor, sensing, connecting, connections, loader, loading, gyrator, gyrating, coordination, coordinating and the like etc. . . . being direct and/or indirect as well as function and or non-functional in nature. In addition, the term responsive, and/or responsive to may indicate that two elements may be coupled in a manner so as to be directly or indirectly connected. In further embodiments this may indicate that one element may respond with a discrete or non discrete action in response to the action or stimulus of a separate element.

As can be seen from figures, the invention consists of generic elements that may be embodied in many different forms. Certain embodiments of the current inventive technology describe methods and apparatus for a wind power generation system generally comprising: at least one wind responsive turbine (1); at least one mechanical connection (2); at least one rotational movement element configured to be responsive to said mechanical connection (3); at least one radius adjustable coupler (4); at least one generator responsive to said radius adjustable coupler (5); and an electrical output (6).

As previously discussed, the current inventive technology may include at least one wind responsive turbine (1). Generally, a turbine may include any device where the kinetic energy of a moving wind is converted into useful mechanical energy. In certain other embodiments said turbine may be responsive to any fluid dynamic, such as pressure, momentum, or the reactive thrust of a moving fluid, such as steam, water, and/or hot gases and the like such that the current inventive technology may be suitable for a variety of power generation application outside of wind power generation.

Generally, as will be discussed in more detail below in some embodiments at least one mechanical connection (2) may include a mechanical device and/or configuration of mechanical devices and/or elements that may be able to mechanically connect to for example a wind responsive turbine (1) with at least one rotational movement element and at least one radius adjustable coupler (4).

Figure 6:
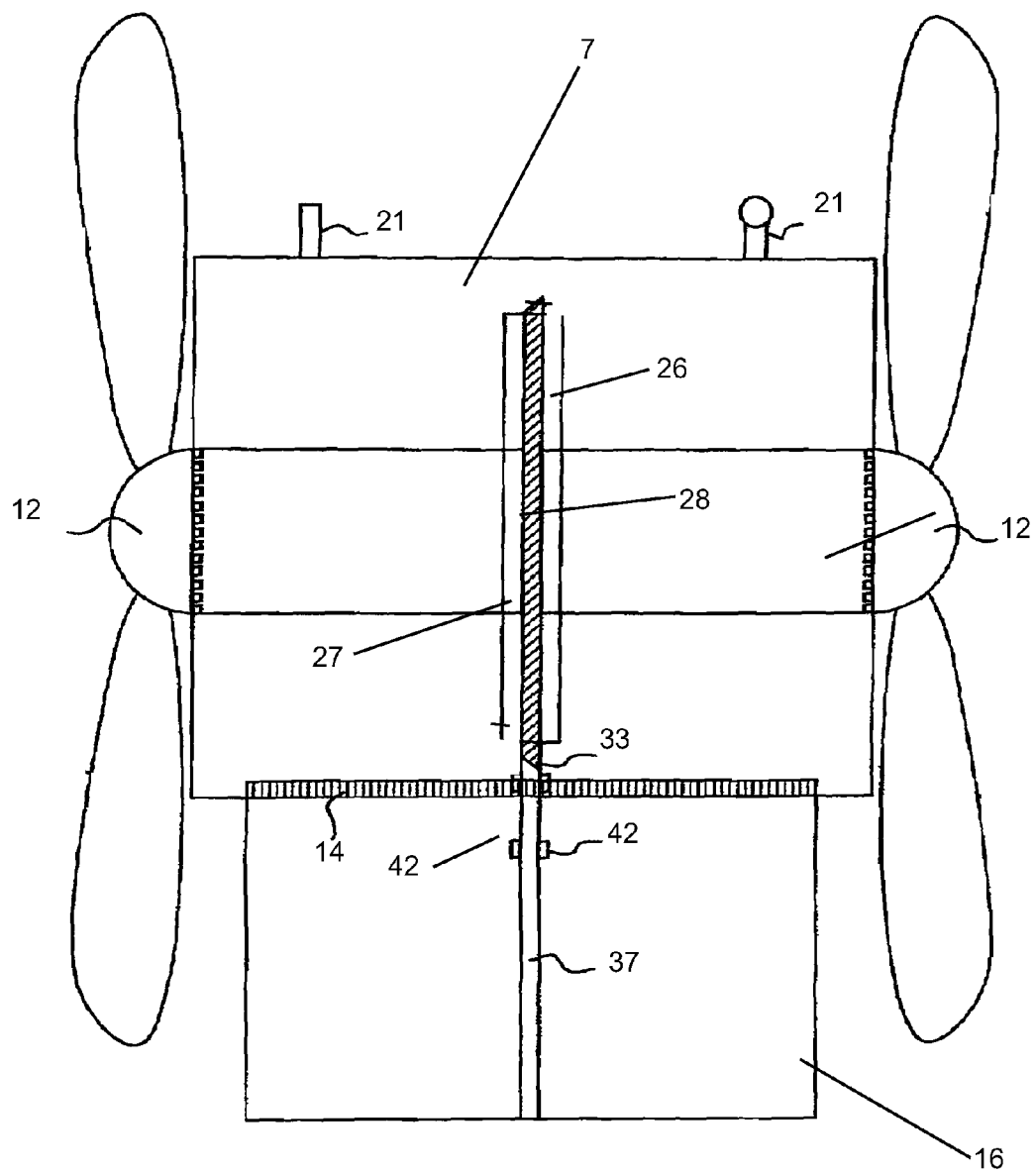
FIG. 6: is a cross-section view of the upper portion of a wind power generation system in one embodiment.

Primarily referring to FIG. 6, wind energy may be captured by at least one wind responsive blade (8) which may be housed in, and/or connected to at least one variable hub assembly (7). In a preferred embodiment, said blade(s) may include an extended arm of a propeller or other similar rotary mechanism. As such the blade(s) may include at least one wind responsive variable pitch blade (9), where said blade(s) may be pitch adjusted according to for example wind velocity and direction.

Further the wind responsive blade(s) may comprise at least one wind responsive dual reverse variable pitch blades (10) which may be coupled so as to rotate synchronously, or may be independently rotatable thereby resulting in at least one wind responsive independent dual reverse variable pitch blade(s) (11). It should be noted that in this application the term rotating and rotation and the like may be generally encompass any repetitive movement. Referring now to FIG. 6, said wind responsive independent dual reverse variable pitch blades (11) may be connected by at least one variable pitch blade hub shaft (12). In a preferred embodiment, wind energy captured by said blade(s) initiates their rotation, which in turn causes the hub shaft to variably rotate according to the amount of wind energy captured by the system. In certain embodiments a variable pitch blade hub shaft rotational adjustor (13) may be mechanically coordinated with the hub shaft allowing for the regulation of its rotational speed. Such a hub shaft rotational adjustor may comprise a brake and/or braking mechanism such as a disk brake. In other embodiments, such a brake may perhaps be an engageable mechanical stop or block preventing the rotational movement of the hub shaft.

In order to control the rotational velocity of the blades and hub shaft, it may be desired to optimize or in some cases increase/decrease wind capture. Optimizing wind capture may include turning the blades(s) more directly into the direction of the wind to increase wind capture, while the step of turning the blade(s) parallel to the wind may decrease the force exerted on them decreasing the total wind captured.

Figure 7:
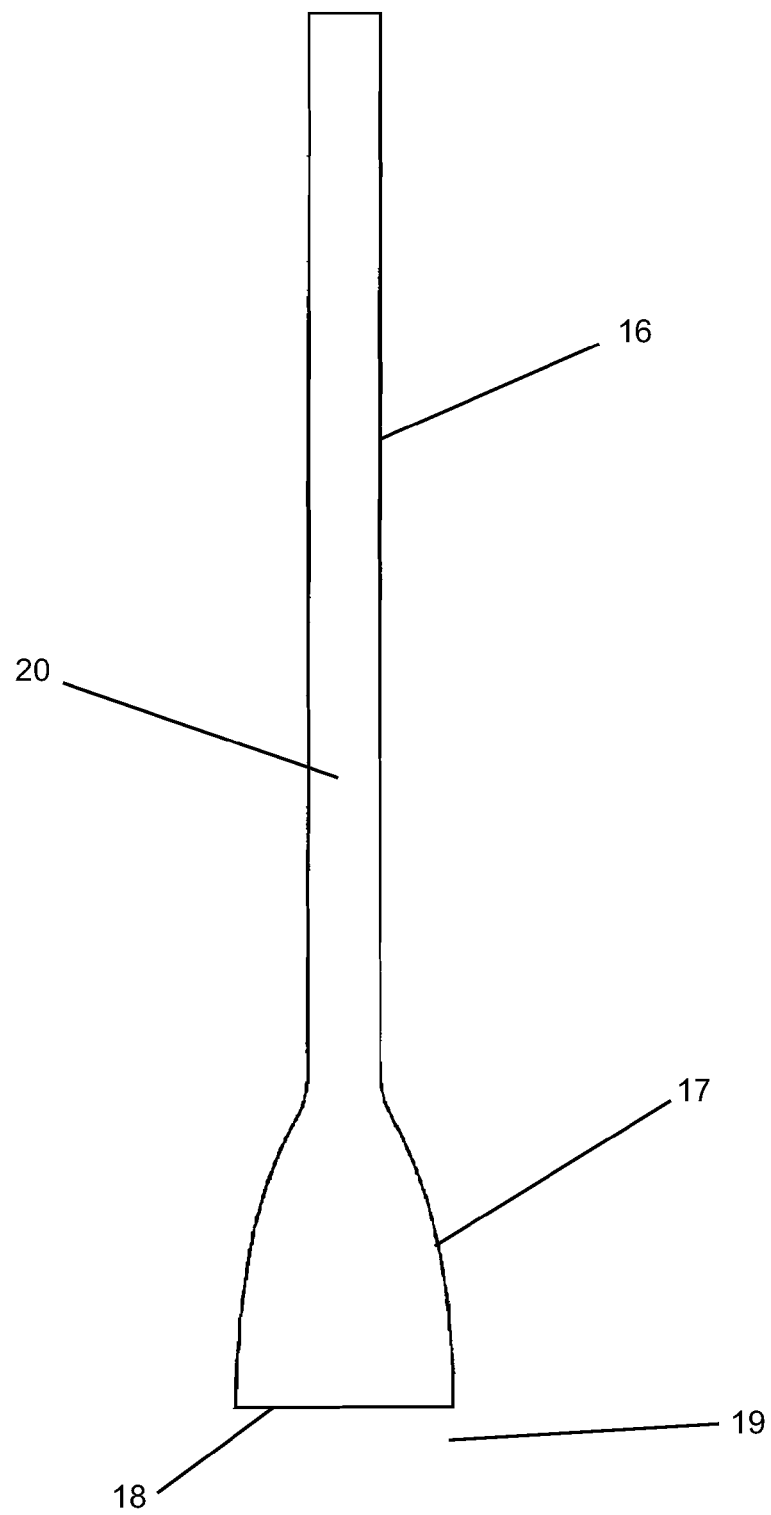
FIG. 7: is a cross-section view of a wind power generation system tower in one embodiment.
Figure 8:
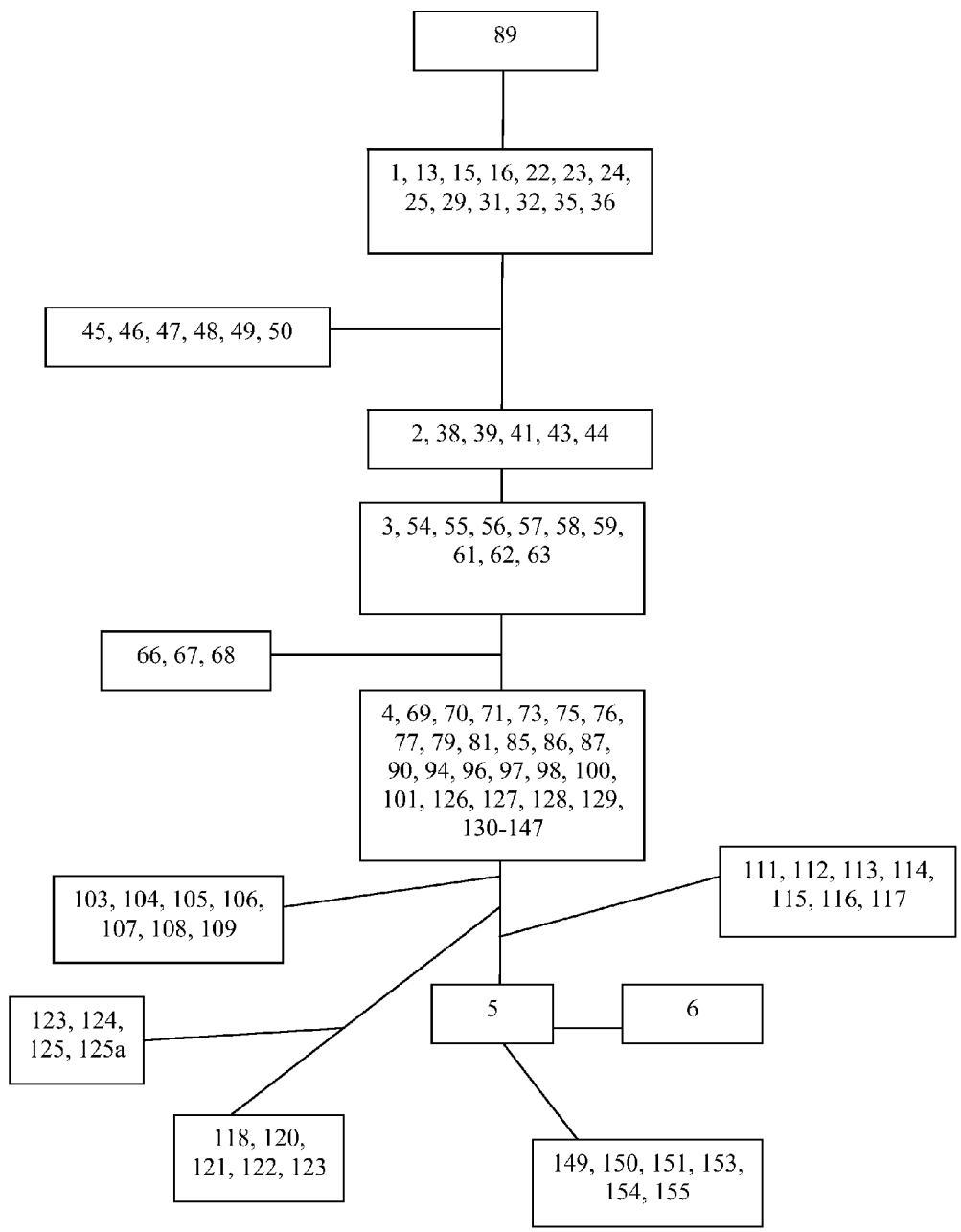
FIG. 8: is a conceptual view of a wind power generation system in one embodiment.
Figure 9:
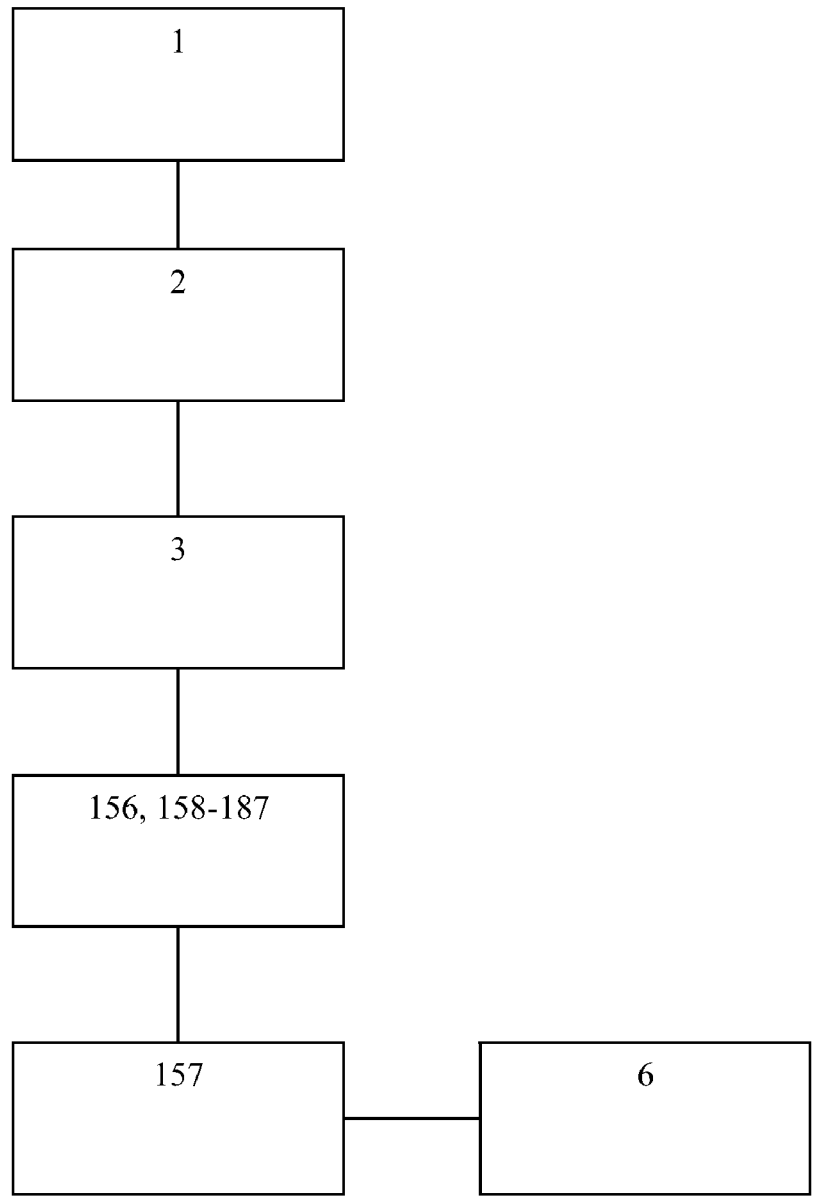
FIG. 9: is a conceptual view of a wind power generation system in another embodiment.
Figure 10:
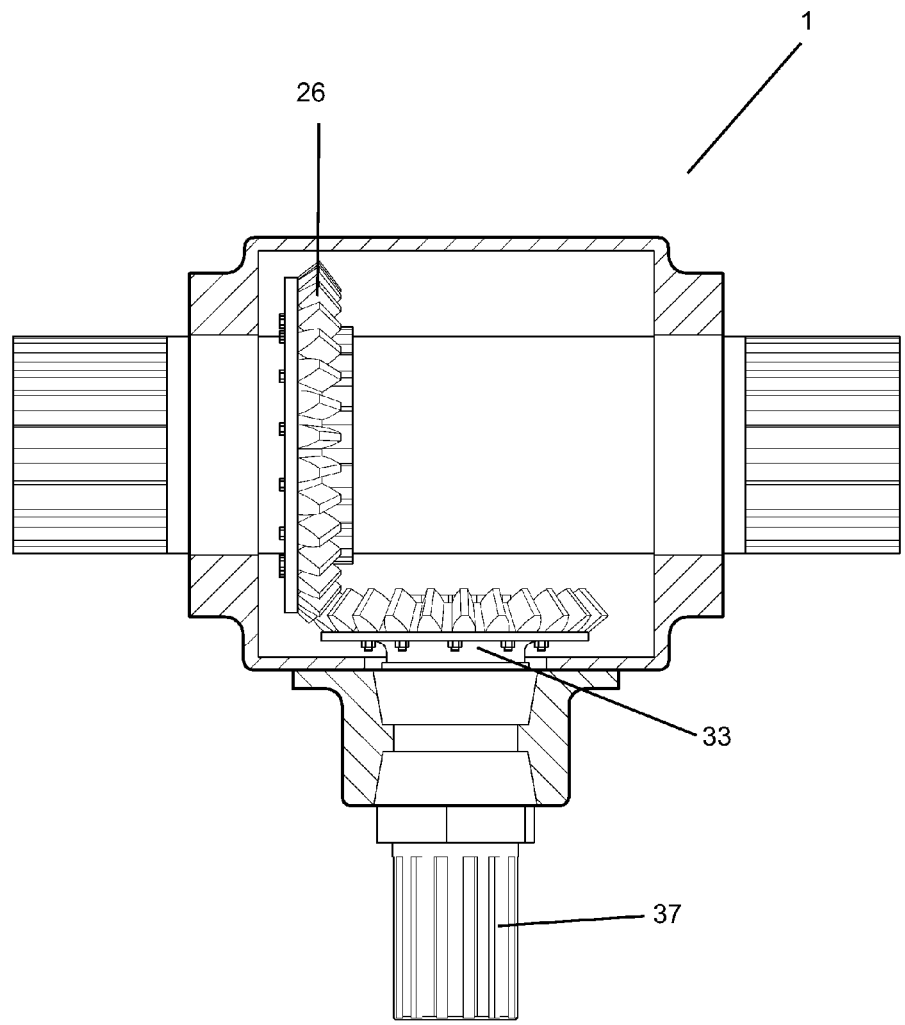
FIG. 10: is a front view of the upper turbine including details of the upper gearing mechanisms in one embodiment thereof.
Figure 11:
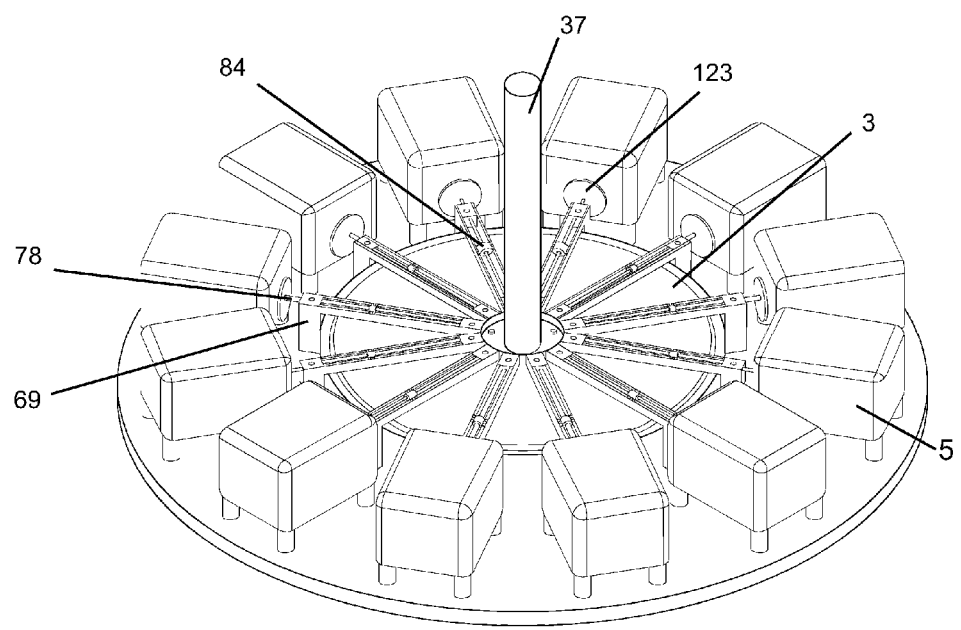
FIG. 11: is a perspective view of a plurality of generators coupled to a single rotational element through a plurality of radius adjustable couplers in one embodiment thereof.
Figure 12:
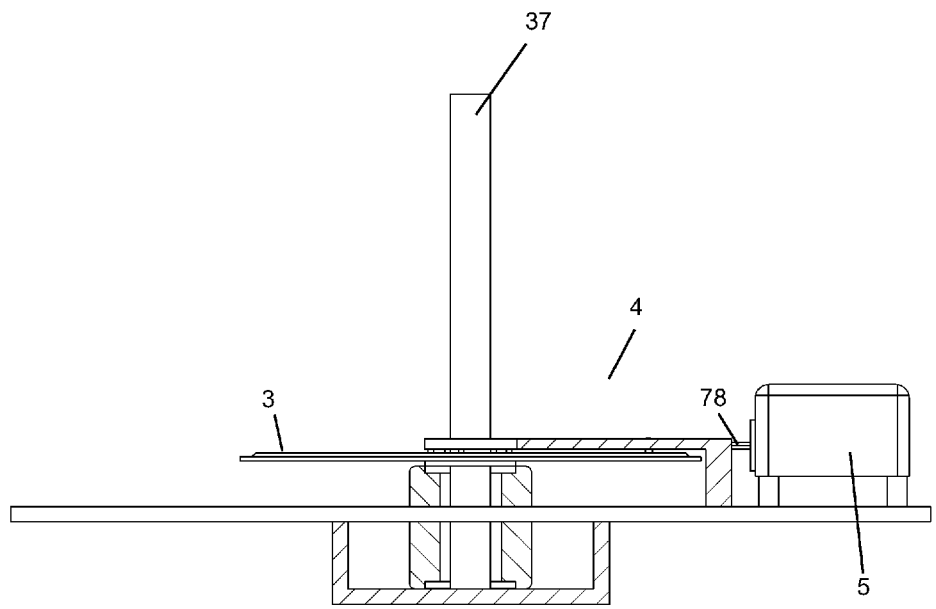
FIG. 12: is a front view of a generator coupled to a rotating element attached to a vertical drive shaft through a radius adjustable coupler in one embodiment thereof.
Figure 13:
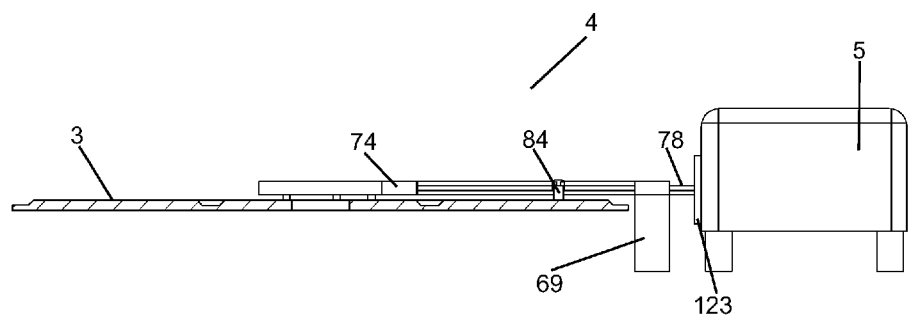
FIG. 13: is a back view of a generator coupled to a rotating element attached to a vertical drive shaft through a radius adjustable coupler in one embodiment thereof.

Again referring to FIG. 6, as discussed previously said wind responsive independent dual reverse variable pitch blades (11) may be connected by at least one variable pitch blade hub shaft (12) which may be further supported by a variable hub assembly that may be mounted to at least one directional gear plate (14). In a preferred embodiment, a variable hub assembly may be mounted to at least one rotatable directional gear plate (15), such that it may facilitate the placement of the blade(s) into the wind, or away from the wind depending on a desired wind yield parameter. Further embodiments may include at least one rotatable directional gear plate mounted to at least one tower (16). Referring to FIGS. 6 and 7, such a tower may generally be a fixed tower, perhaps constructed from a plurality of variable length individual fitted tower sections (20). Further, said tower may contain at least one mounted base pod (17) which may act as an extended housing for further components of the wind power generation system as will be discussed in more detail below. It should be noted that such a base pod (17) may be supported by at least one base pod foundation (18), and that this foundation may in fact be positioned underground (19) providing among other benefits enhanced tower stability, weight distribution, power generation capability, lowering the systems visible profile and aesthetic appearance and as will be discussed below facilitating a multi-generator configuration.

Such a rotatable directional gear plate (15) may be a responsive to at least one variable pitch motor (22). In a preferred embodiment, a variable pitch motor(s) may be for example a motor that is mechanically coordinated with a directional gear plate and may be engaged so as to drive the rotational adjustment of the directional gear plate, placing the wind responsive blade(s) (8) more directly or indirectly into the wind thereby adjusting the systems overall wind capture. Further, such a rotatable directional gear plate (15) may be supported by at least one rotatable directional gear plate support adjustable bearing (23) allowing for its full 360° rotational pitch or directional variability.

In some embodiments said bearing may be perhaps a rotatable directional gear plate adjustable roller bearing (24). In one such configuration such a roller bearing may for example have cylindrical or tapered rollers running between two separate concentric rings, formed by said fixed tower and one floating bearing supporting the rotatable directional gear plate (15). Further embodiments may comprise at least one rotatable directional gear plate rotational regulator (25) such as a brake or mechanical stop allowing for the hub assembly to be maintained in a desired wind capture position.

In a preferred embodiment, such a bearing system may allow for said hub assembly to be supported on a freely rotatable directional gear plate (15) by a roller bearing, so as to require minimal power output by said variable pitch motor (s) to rotate the hub assembly, mechanically rotating on said directional gear plate to increase or decrease wind yield such as would be desired to regulate the rotational velocity of other elements of the system thereby adding an additional control mechanism to regulate and direct for example a radius adjustable coupler (4), rotational movement element, associated generator(s) RPM and associated electrical output.

Primarily referring to FIGS. 1-9, certain preferred embodiments may include at least one sensor (21). In a preferred embodiment said sensor may include a wind direction and/or velocity indicator as well as perhaps an environmental sensor capable of measuring and signaling a common environmental condition such as air pressure, humidity, precipitation etc. In addition, said sensor may be able to detect the operational characteristics of the current wind power generation system and output parameters herein described.

Referring to FIG. 6, the inventive technology may include at least one directional gear band (26). Such a directional gear band may comprise for example a coupled flywheel or other extended gearing that may be mechanically coupled to at least one variable pitch blade hub shaft (27) and further may transmit and/or redirect any or all wind derived rotational energy to for example at least one directional gear hub (33).

In preferred embodiment, at least one directional gear band (26) may be fitted to at least one variable pitch blade hub shaft (27) perhaps through at least one variable pitch blade hub shaft engagement aperture (28). Such an aperture may be fitted so as to be locked into a single position, perpendicular to said hub shaft while perhaps other embodiments may include a movable engagement aperture allowing said directional gear band (26) to freely move along the radius of a surface, continuum or differential gearing positions so as to be adjustably coupled with additional elements as will be discussed below.

Further embodiments may include at least one approximately at least 45° degree directional gear band fitted to said at least one variable pitch blade hub shaft (30). Further embodiments may include at least one approximately 14 foot diameter directional gear band fitted to a variable pitch blade hub shaft (31) which may incorporate at least one approximately 4 inch wide directional gear band fitted to said at least one variable pitch blade hub shaft (32).

As discussed, again referring to FIG. 6, certain embodiments may include at least one directional gear band (26) mechanically coordinated with at least one directional gear hub (33). A preferred embodiment may perhaps include at least one directional gear hub mechanically mated with said at least one directional gear band (34). Such a mechanical mating may be achieved through a traditional gearing or other mechanical coupling, radius coupling or continuum coupling. Further embodiments may include at least one approximately at least 45° degree directional gear hub mechanically mated with at least one approximately 45° directional gear band fitted to at least one variable pitch blade hub shaft (35). Further embodiments may perhaps include at least one approximately at least 4 inch wide directional gear hub mechanically mated with at least one approximately 4 inch wide directional gear band fitted to a variable pitch blade hub shaft (36). As can be seen in FIG. 6, owing to the size differences the directional gear hub (33) may rotate at a significantly faster rate than the directional gear band (26).

The current inventive technology may include at least one rotatable drive shaft (37), which referring primarily to FIGS. 1 and 6 may include at least one substantially vertical rotatable drive shaft (38). Again referring to FIGS. 1 and 6, this vertical drive shaft may include perhaps at least one substantially vertical drive shaft mechanically fitted with said directional gear hub (39). The directional gear hub may innervate a directional gear band (26) which may innervate at least one directional gear hub (33), which may in turn cause a rotational force to be exerted on the rotatable drive shaft (37) causing it to rotate. Some embodiments may further include at least one substantially vertical drive shaft mechanically fitted with said directional gear hub supported by at least one rotatable drive shaft base support bearing (40). Such a support bearing may include for example a rotatable bearing, or perhaps a roller bearing. Additionally, to maintain stability and reduce frictional loss thereby improving wind capture yield and the wind energy transfer of the drive shaft, certain embodiments may include at least one substantially vertical rotatable drive shaft stabilized by at least one drive shaft bearing (42).

Further embodiments of said rotatable drive shaft (37) may comprise a plurality of variable individually fitted rotatable drive shaft sections (41). In such a configuration, said individually fitted rotatable drive shaft sections may be constructed on-site as well as be individually replaced as they wear out or perhaps break allowing for a minimization of cost, labor and down time of the entire wind power generation system.

As can be seen, in certain embodiments, the current inventive technology contemplates at least one substantially vertical drive shaft mechanically fitted to at least one secondary directional gear hub (43). Such a secondary directional gear hub may include a plurality of gear hubs that may be individually or collectively configured to rotate in response to the rotational movement of a drive shaft. Further embodiments may include at least one secondary directional gear hub mechanically fitted to at least one secondary rotatable drive shaft (44). As such, in some preferred embodiments said directional gear band (26) may innervate a directional gear hub (33) which may further cause a drive shaft to rotate, which may further innervate a plurality of secondary directional gear hubs which may rotate a plurality of secondary rotatable drive shafts. Such a configuration allows for a multi-drive shaft configuration that may perhaps be utilized to increase overall generator capacity and electrical output.

As discussed previously, said wind power generation system is configured in some instances to produce constant generator RPM as well as generate an electrical output across a range of wind velocities and turbine RPM where current wind power generation system cannot traditionally operate. As can be understood, wind as well as other fluid dynamics may be variable and there may arise a desire to disengage temporarily certain elements of such a wind power generation system such as at extremely low or extremely high wind velocities where operation would be dangerous or perhaps economically inefficient. In certain other embodiments, it may be desired to disengage certain elements of said wind power generation system to conduct maintenance and/or cleaning, or alter various operational characteristic and/or output parameters. As such, certain embodiments contemplate at least one automatic disengagement connection (45). Such an automatic disengagement connection may include an automatic disengagement connection responsive to said sensor (46) or perhaps at least one automatic disengagement connection responsive to at least one output parameter (47) such that certain elements may be engaged or disengaged, perhaps for example by a hydraulic mechanism, a motor driven mechanism, a releasable connection or other moveable element that facilitates the physical connection and/or disconnection of two separate element automatically in response to a signal or a controller, or even perhaps manually when a certain operating threshold is met or exceeded or even based on an operators desire or need. For example, some embodiments may include at least one automatic disengagement connection that mechanically disengages said directional gear hub and said directional gear band (48) or perhaps at least one automatic disengagement connection that mechanically disengages said directional gear band and said variable pitch blade hub shaft (49).

Still further embodiments may include at least one automatic disengagement connection that mechanically disengages said directional gear hub from said rotatable drive shaft (50). As discussed above, wind or other fluid dynamic energy is captured by the systems blades causing them to rotate, which in turn causes for example a directional gear band (26) to rotate which in turn innervates at least one directional gear hub (33) mechanically fitted in some instances to a rotatable drive shaft that, as discussed previously rotates at a higher rate of speed due to differential ratios between the elements. Primarily referring to FIG. 1, the current inventive technology may comprise at least one platen (51) which may in some cases include at least one platen mechanically attached to said rotatable drive shaft (52). Further embodiments may additionally include at least one detachable platen mechanically attached to said rotatable drive shaft (53).

Figure 4:
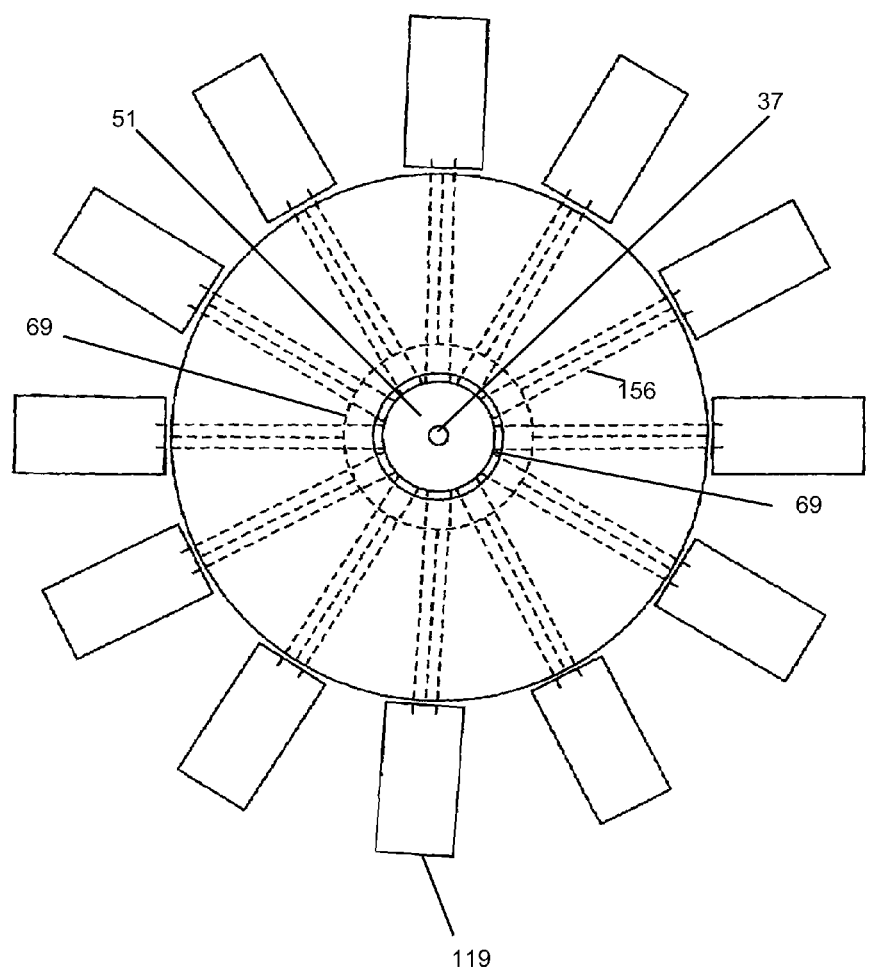
FIG. 4: is a top view of a plurality of wind power generation system couplers circularly positioned around a platen connected to a vertical rotatable drive shaft in one embodiment.

Primarily referring to FIG. 1, such a platen may generally comprise a round, substantially flat table, or flywheel that may freely rotate around a central axis. As can be seen in FIG. 4, in some embodiments a platen may rotate correspondingly to the rotation of a rotatable drive shaft which may be positioned and/or mechanically connected along a platen's central axis. In such a configuration, wind energy captured by the current system and transferred through said directional gear band, to a directional gear hub and then to a rotatable drive shaft may result in the wind or other fluid dynamic responsive rotation of said platen.

Various other embodiments may include a plurality of substantially vertically stacked platens mechanically attached to at least one rotatable drive shaft (56). As can be seen in FIG. 1, such a vertical stack of platens may be placed at a variety of positions allowing for additional generators to be positioned responsive to various platens. Additional embodiments may include platens vertically stacked for example in a base pod in such a configuration so as to increase the total number of generators that may be innervated at any point in time thereby increasing the potential electrical output that may be generated and outputted at any given point as well as allowing for electrical generation at wind velocities and turbine RPM outside the operational ranges of many traditional wind power generation systems.

In such a configuration these vertically stacked platens may rotate synchronously with each other or in other instances may rotate individually. Such an embodiment may include a plurality of substantially vertically stacked independent platens mechanically attached to at least one rotatable drive shaft (57). As discussed previously, in certain embodiments the current inventive technology may comprise for example a plurality of substantially horizontally stacked platens mechanically attached at least one rotatable drive shaft (58) which may further include a plurality of substantially horizontally stacked independent platens mechanically attached at least one rotatable drive shaft (59).

As indicated in FIG. 1, in order to reduce frictional energy loss, vibration as well as provide for a consistent and/or smooth rotation of a platen element it may be desired to provide a support and/or buffering element. Embodiments of the current inventive technology may include at least one platen support (60). Such a platen support may include for example at least one platen support selected from the group consisting of: at least one platen bearing; at least one roller bearing; at least one rotatable bearing; at least one platen stabilizer such as a shock absorber; and/or at least one hydraulic support (61).

In certain embodiments a platen may include at least one high grade stainless steel platen approximately at least 3 inches thick and approximately at least 14 feet in diameter (62). In other embodiments, said platen may include a significantly larger platen. As can be understood from the forgoing to overcome the platen's inertia may require differential gearing or couplings as contemplated in this application, but as the platens rotational speed becomes sufficient to couple a generator to said platen and an industrially usefully electrical output is achieved, said platens momentum may allow it to continue rotating even as wind velocity has been reduced for example to zero allowing for additional electrical outputting and reducing system non-generation time.

As it may be desired to regulate the rotational speed of a platen and its various associated elements and ultimately the systems coupled generators and their electrical output, certain embodiments of the invention may include at least one platen load adjustor (63). Such platen load adjustor (63) may include in certain instances a brake device to reduce the rotational speed of a platen. In some case this brake mechanism may be a for example a hydraulic, disk brake mechanism, gearing mechanism or other commercially available brake or gearing device while in certain other embodiments such a platen load adjustor may include a load generator that may reduce the rotational speed of a platen through an increased load or perhaps frictional element. In other instances, such a platen load adjustor (63) may comprise a platen driver, such as a motor to increase its rotational speed to perhaps provide an initial rotational energy sufficient to overcome the initial platen's inertia.

Further, as discussed previously it may be desired to disconnect various elements of the system for a variety of reasons. As such, certain embodiments may comprise at least one platen automatic disengagement connection responsive to at least one output parameter (55). Such a connection may, for example include a meshed and/or extendable connection that may be for example raised and lowered along the axis of a drive shaft to fit into a platen engagement connection. Again, such a platen connection may be automatically engaged or disengaged by a controller (as will be discussed more below) responsive to a pre-determined operational threshold. In some instances, when such a pre-determined operational threshold is sensed, for example wind speed or direction has reached a pre-determined level and is sensed by a sensor or controller, a signal is sent directing a platen connection, or multiple platen connections to be engaged or disengaged automatically. In such a manner, multiple platens can be sequentially engaged and/or disengaged according to an output parameter.

As discussed previously, in order to achieve system control it may be desired to control, activate, sense, engage, disengage, deactivate, and/or otherwise manage in a sequential or even non-sequential manner the various elements of the current inventive technology. As such, various embodiments of the current inventive technology may include at least one controller (64). Such a controller in various embodiments may include, but is not limited to at least one radius adjustable coupler controller (65), at least one radius adjustable coupler controller responsive to said sensor (66), at least one signal element (67), and/or at least one radius adjustable coupler controller responsive to at least one output parameter (68).

In a preferred embodiment, such a controller may be a novel computerized, software, or hardware based solution or combination thereof that may have the ability to control, sense, compile, compute, alert, calculate and optimize the operating parameters, configurations, engagement, disengagement, operation and/or output parameters of the various elements of the current inventive technology. In a general sense, a controller in some instances is able to coordinate the operation of the various elements so as to optimize according to a desired target the systems output which may be expressed in some instances as an electrical output. In a preferred embodiment, said controller may be able to detect an output parameter and/or a change in output parameter and adjust the function of any of the operational configurations of the described elements in response to that output parameter.

In a general sense, an output parameter is any operational variable that may affect the generation of an electrical output or operation of the described wind power generation system. Such output parameters and changes over time may be sensed, tracked, calculated and presented as a sensible indication, perhaps through a computer interface by a controller (64) and/or perhaps a sensor (21).

Examples of the various output parameter(s) contemplated in the current inventive technology may include but are not limited: wind velocity, wind direction, tower direction, pitch, yaw, wind capture yield, fluid dynamic parameters, electrical output, various weather conditions, multi-tower synchronization, electrical generation, generator RPM, blade RPM, turbine RPM, movement of other system elements, coupler function, couplers engagement, coupler disengagement, gyrator position, gyrator engagement, gyrator disengagement, configuration of individual elements, generator capacity, generator output, electrical grid output, electrical cycles, mechanical stress, mechanical failure, load, generator load, platen load, component failure, heat, vibrational energy, frictional energy, production capacity, optimal configuration; configuration to achieve desired electrical output, speed, rotational speed of any element of the current inventive technology, momentum of any element of the current inventive technology, movement of any element of the current inventive technology, operating status of any element of the current inventive technology; position and/or operational configuration of any element of the current inventive technology; number of engaged or disengaged elements of the current inventive technology and the like.

Figures 2, 3:
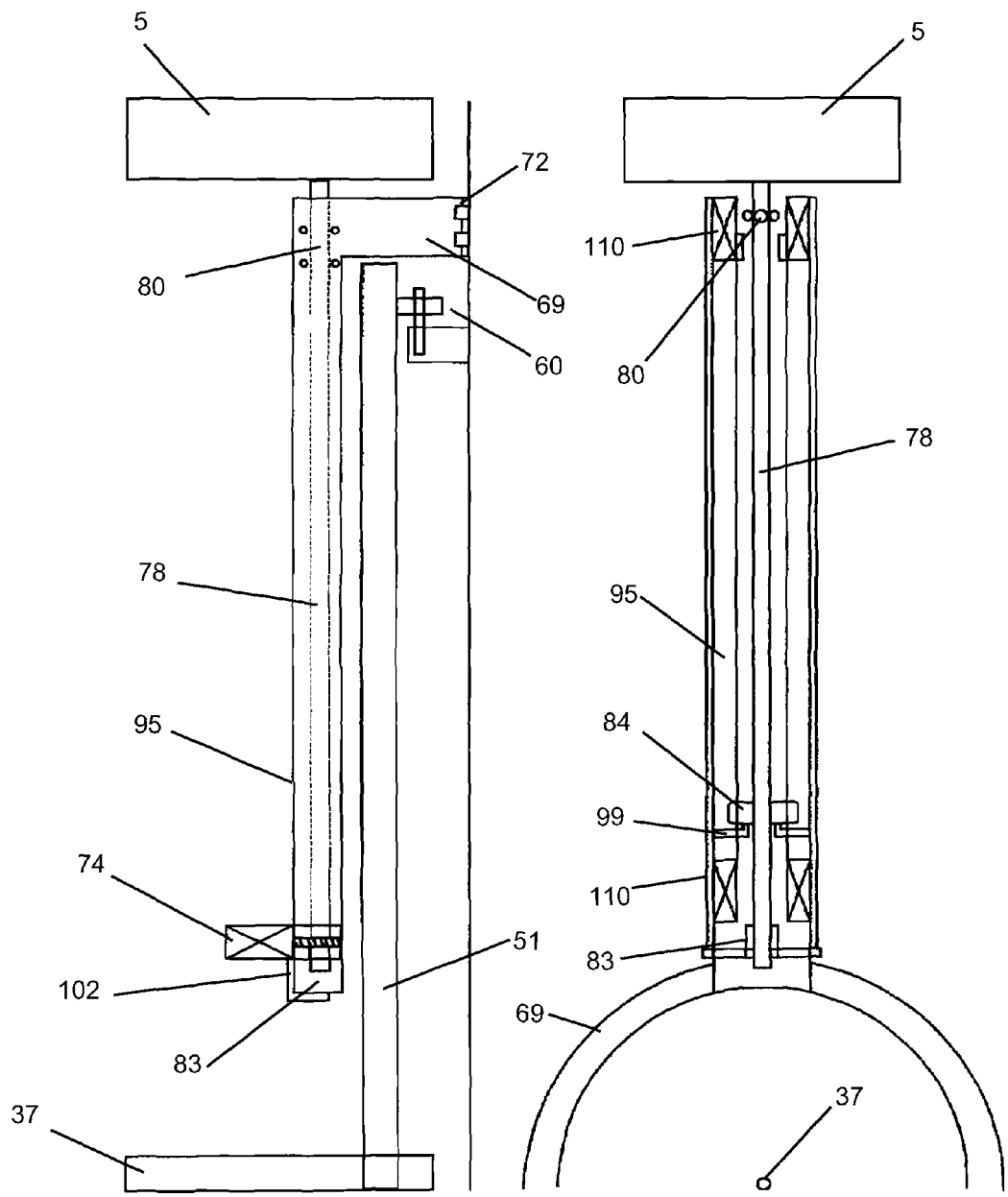
FIG. 2: is a side view of a wind power generation system coupler in one embodiment.
FIG. 3: is a top view of a wind power generation system coupler in one embodiment.

Referring primarily to FIGS. 2 and 3, as generally described in certain embodiments, wind or other fluid dynamic energy may rotate the wind responsive blades, which in turn rotates a directional gear band mechanically connected to a hub shaft. The directional gear band is mechanically mated with a directional gear hub which spins at a faster rate that the directional gear band due to differential gearing or coupling. The directional gear hub is mechanically fitted with a rotatable drive shaft which is in turn mechanically coordinated with at least one platen which rotates synchronously with said drive shaft. In certain embodiments, as will be explored in more detail below, said platen may be coordinated with at least one radius adjustable coupler (4) and at least one generator responsive to said radius adjustable coupler (5). Generally, as wind velocity increases, platen rotation speed increases. As the rotational speed of the platen reaches perhaps a threshold rotational velocity said radius adjustable coupler (5) coordinated with at least one generator is engaged. Such engagement in some embodiments may include at least one radius adjustable coupler load engagement device (74), which in some instances may facilitate the connection of at least one gyrator (84) onto the surface of a rotating platen. This gyrator (84) may, in some embodiments be mechanically connected to a generator through at least one radius adjustable coupler drive shaft (78). As the gyrator is rotating along the surface of the platen, it in turn rotates the radius adjustable coupler drive shaft (78) which may be further connected to a generator causing the rotor of said generator to rotate within the stator, and with the application of a magnetic field or field, an electrical output (6) is generated.

As can be seen, as wind velocity increases (or decreases) the rotational speed of the platen may correspondingly increase (or decrease). Since the laws of physics dictate that the rotational velocity of a platen is greater the further it is from its central axis, a gyrator freely rotating along the surface of such a platen may have a higher rotation velocity the further it is from the platens rotational axis. In certain embodiments, as the rotational speed of a platen increases, as will be discussed in more detail below said gyrator (84) may be adjusted or accommodated to a position of lower rotational speed. Such a location may be at a position closer to the rotational axis of the platen. In this manner the rotational speed of the gyrator, and corresponding radius adjustable coupler drive shaft (78) may be reduced or held at a constant rotational velocity, thereby maintaining the rotational velocity of the a generator rotor. The result of this is that while wind velocity may modulate, generator RPM and electrical output may be maintained at a constant optimal rate depending on the size and parameters of the specific coupled generator(s) in use.

In still further embodiments, a plurality of radius adjustable coupler(s) (4) may be coordinated with a plurality of generators. As describe previously, as the wind velocity increases, the rotational speed of a platen may correspondingly increase and can accept a plurality gyrators coordinated with a plurality of radius adjustable coupler(s) (4). The position of each gyrator maybe adjusted and/or accommodated to a position along the radius of the surface of a platen radius corresponding to a rotational speed that maintains the coupled generator(s) at a constant RPM, constant electrical output, or other desired output parameter. In this manner, additional radius adjustable coupler(s) (4) may be brought on- and off-line as wind speed increases/decreases. The wind power generation system allows for electrical output generation to begin at a lower blade/turbine RPM than many traditional wind power generation systems and continue even at high winds when traditional wind power generation systems may not operate. Each of these individual elements and their various embodiments will be taken up in turn.

Primarily referring to FIGS. 2 and 3, as discussed previously certain embodiments of the current inventive technology may include at least one radius adjustable coupler load engagement device (74). In certain embodiments, in response to perhaps an output parameter, such as the rotational speed of a platen, at least one radius adjustable coupler load engagement device (74) may load or move into a contact position a gyrator (84) with a platen. In a preferred embodiment said gyrator (84) is held in perhaps a perpendicular position above a platen. Perhaps in response to an output parameter, or an operator's desire, the gyrator may be lowered into a position in contact with the platen. In a preferred embodiment said gyrator may be loaded utilizing perhaps a simple clutch.

As discussed previously, this gyrator/platen load contact may occur at a plurality of positions along the radius of the platen dependant perhaps on the desired rotational speed of the platen and further perhaps the desired or pre-determined rotational speed of the gyrator, generator RPM and/or electrical output. In some instances such a gyrator coming into contact with a platen would cause a generator resistance load to be placed on the platen as the rotational energy transferred to the rotating gyrator, which in turn rotates for example a radius adjustable coupler drive shaft (78) generally must overcome the resistance of the generator to produce an electrical output. Some embodiments may include as at least one variable load position radius adjustable coupler load engagement device (75) whereas discussed previously, said gyrator may be loaded onto said platen and provide a resistance load that may reduce the rotational speed of the platen. In such a manner, the gyrator may be variably loaded, in that the gyrator may be loaded at various positions and/or pressures into the platen causing resistance load to be exerted, or in other cases the load pressure may be reduced reducing the overall load on the platen. In this manner, in some embodiments such variable load position radius adjustable coupler load engagement device (75) may act as a platen brake or rotational speed regulator, which may further regulate a coupled generator RPM as well as electrical output.

In certain embodiments, the current inventive technology may include at least one radius adjustable coupler load engagement device responsive to said at least one radius adjustable coupler controller (76). As discussed previously, that gyrator may be loaded or otherwise be brought into contact with a platen in response to an output parameter or in some instances a change in output parameter which may be sensed, and communicated and/or executed by a controller as previously discussed.

Further embodiments, of the inventive technology may include various mechanisms to load or otherwise bring a gyrator into contact with a platen in response to an output parameter. Various mechanisms and/or devices for this loading/engagement may include at least one spring actuated radius adjustable coupler load engagement device responsive to said at least one radius adjustable coupler controller; at least one motorized radius adjustable coupler load engagement device responsive to said at least one radius adjustable coupler controller; at least one servo motor actuated radius adjustable coupler load engagement device responsive to said at least one radius adjustable coupler controller; at least one clutch radius adjustable coupler load engagement device responsive to said at least one radius adjustable coupler controller; at least one magnetized radius adjustable coupler load engagement device responsive to said at least one radius adjustable coupler controller; and at least one hydraulic radius adjustable coupler load engagement device responsive to said at least one radius adjustable coupler controller (77).

Primarily referring to FIG. 3, as discussed previously the current inventive technology may include at least one gyrator (84), which may be a rotating element, for example a spinner wheel that may be loaded onto a platen. Further other embodiments may include at least one radius adjustable coupler gyrator (85), which as shown in FIG. 3, may be a rotating element such as a spinner wheel that may be loaded at a position along the radius of a platen by the action of for example a radius adjustable coupler load engagement device (74). Further, such a gyrator may include at least one engageable radius adjustable coupler gyrator (86), where said gyrator may be mechanically engaged and/or mechanically disengaged perhaps as directed by a controller, where the gyrator in a disengaged position may freely rotate but does not cause rotation of an connected radius adjustable coupler drive shaft (78).

Figure 5:
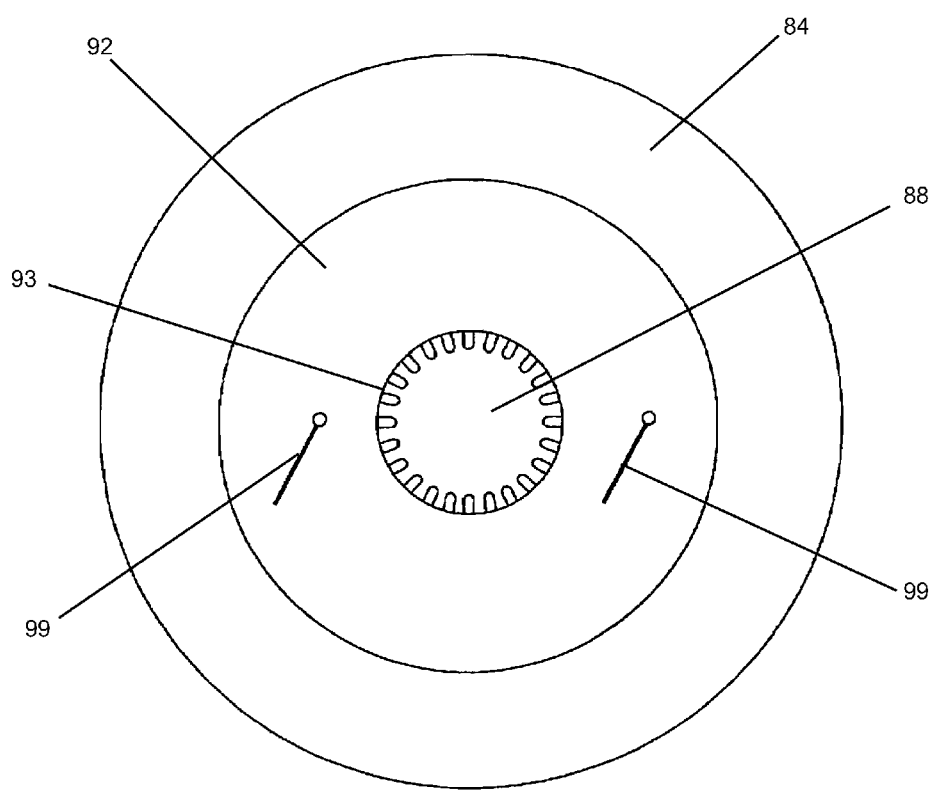
FIG. 5: is a gyrator in one embodiment.

Referring to FIGS. 3 and 5, in some embodiments a gyrator element may include at least one radius adjustable coupler gyrator adjustably coordinated with: said radius adjustable coupler engagement device; at least one platen; and at least one slideable radius adjustable coupler drive shaft engagement aperture (88). As discussed previously, a gyrator, when loaded onto a rotating platen may begin to rotate corresponding, which in turn rotates at least one radius adjustable coupler drive shaft (78). In certain embodiments, a radius adjustable coupler drive shaft (78) is mechanically coordinated with a gyrator through at least one slideable radius adjustable coupler drive shaft engagement aperture (88). Still further embodiments include at least one slideable radius adjustable coupler drive shaft engagement aperture adjustably mated to at least one radius adjustable coupler drive shaft (90). In certain embodiments, an aperture may include a shaped configuration so as to engage a corresponding shaped radius adjustable coupler drive shaft coordinating their synchronous rotation. As described, this shaped aperture may be freely floating so that the gyrator may in fact slide along the length of the radius adjustable coupler drive shaft (78). This sliding may occur as described previously, when the gyrator is adjusted and/or accommodated to a position along the radius of a platen that exhibits a desired or pre-determined rotational velocity. Further embodiments may include at least one detachable slideable radius adjustable coupler drive shaft engagement aperture (91) where said aperture may automatically or manually mechanically detach from a radius adjustable coupler drive shaft perhaps in response to an output parameter and/or controller. In such an instance the gyrator is free to maintain constant contact with for example a rotating platen, while the corresponding radius adjustable coupler drive shaft is not rotating, effectively disengaging the corresponding generator(s) and ceasing electrical generation and outputting. This detachable slideable radius adjustable coupler drive shaft engagement aperture (91) provides an additional measure of control to the system and allows for the constant connection of a gyrator element with a platen for example.

Additional embodiments may include at least one pliant radius adjustable coupler drive shaft (79) such that when, for example a radius adjustable coupler load engagement device (74), that is engaged with a gyrator through for example a centrally located slideable radius adjustable coupler drive shaft engagement aperture (88) may be flexed or bent in a plurality of directions so as to continuously maintain a mechanical connection and rotation with a corresponding generator.

In a preferred embodiment at least one radius adjustable coupler drive shaft tractable connector may be connected to at least one generator drive shaft (81). This connection may be accomplished as demonstrated in FIGS. 2 and 3 by at least one radius adjustable coupler drive shaft tractable connector (80). In a preferred embodiment such a connection may allow for a pliant radius adjustable coupler drive shaft (79) to be bent or flexed for example in an up and down plane as a gyrator is loaded onto and off a rotating platen while maintaining a consistent mechanical connection and rotation with a corresponding generator. In some embodiments said radius adjustable coupler drive shaft tractable connector (80) may include a universal connection or joint. Further embodiments as demonstrated in FIG. 2 include at least one radius adjustable coupler drive shaft support bearing (82) which may encompass at least one rotatable radius adjustable coupler drive shaft support bearing (83), such as a pilot bearing or other rotatable bearing mechanism that may allow for rotation of the radius adjustable coupler drive shaft while reducing friction and vibrational disturbance.

Referring now to FIG. 5, in some embodiments a gyrator may include a rotating element as previously described as well as at least one non-rotational gyrator support (92). In a preferred embodiment at least one radius adjustable coupler gyrator may be mechanically connected to at least one non-rotational gyrator support by at least one rotational bearing (94). Additionally, the inventive technology may encompass as indicated in FIG. 5, at least one slideable non-rotational gyrator support radius adjustable coupler drive shaft aperture (93). Similar to the discussion above, such a slideable non-rotational gyrator support radius adjustable coupler drive shaft aperture may allow for a radius adjustable coupler drive shaft to be threaded or placed centrally through said element and may freely slide along its length.

Now, referring to FIGS. 2, 3 and 5, as discussed previously a gyrator, mechanically connected through a rotational bearing supported by a non-rotational gyrator support may freely move across the face of a rotating platen, while mechanically coupled to a radius adjustable coupler drive shaft. The rotation of this gyrator and corresponding radius adjustable coupler drive shaft is coupled when engaged. It may be desired to control and position the gyrator along a rotating platen to achieve an optimal or pre-determined platen rotational velocity, gyrator rotational velocity, radius adjustable coupler drive shaft rotational velocity, as well as generator RPM and/or electrical output for example. As shown in FIGS. 2 and 3, certain embodiments may include at least one radius adjustable coupler drive shaft guide track (95), which in some embodiments may include at least one rotatable threaded track (96) or at least one all-thread rod (97). Certain embodiments as shown may include at least one radius adjustable coupler drive shaft guide track positioned parallel to said at least one radius adjustable coupler drive shaft (98). As such, at least one non-rotational gyrator support guide track attachment (99) may be established mechanically connecting the non-rotational gyrator support (92) (which is mechanically connected to said gyrator by a rotatable nearing) with said radius adjustable coupler drive shaft guide track (95). In some embodiments said radius adjustable coupler drive shaft guide track (95) may extend along the entire or nearly the entire radius of a platen such that the gyrator may be loaded and freely move along the face of a rotating platen to a position of optimal or pre-determined rotational velocity with said radius adjustable coupler drive shaft guide track (95) acting as a support guide to direct the gyrators position. Some embodiments of the current inventive technology may comprise at least one adjustable non-rotational gyrator support guide track attachment (100) such that some embodiments may include at least one threaded non-rotational gyrator support guide track attachment mechanically mated with said at least one radius adjustable coupler drive shaft guide track (101).

In such an embodiment said guide track can be, for example a freely rotatable threaded rod that freely rotates in response to the activation of at least one radius adjustable coupler gyrator position calibrator (110). In some embodiments, this calibrator adjusts the position of the gyrator along the radius of a platen. In some embodiments this calibrator element may be a servo motor or perhaps an adjustable hydraulic element. Some embodiments may include but are not limited to at least one radius adjustable coupler gyrator calibrator selected from the group consisting of: at least one radius adjustable coupler gyrator slide calibrator; at least one radius adjustable coupler gyrator rail calibrator; at least one radius adjustable coupler gyrator magnet calibrator; at least one radius adjustable coupler gyrator electric motor calibrator; at least one radius adjustable coupler gyrator spring calibrator; at least one radius adjustable coupler gyrator servo motor calibrator; and at least one radius adjustable coupler gyrator hydraulic calibrator (114).

Primarily referring to FIGS. 2 and 3, embodiments of the current inventive technology may include at least one radius adjustable coupler gyrator calibrator adjustably coordinated with said at least one radius adjustable coupler drive shaft guide track and/or said at least one non-rotational gyrator support by said non-rotational gyrator support guide track attachment (115). In certain embodiments a threaded non-rotational gyrator support guide track attachment is threaded onto a rotatable threaded track (96) or at least one all-thread rod (97). In some embodiments said radius adjustable coupler gyrator position calibrator (110), may perhaps include at least one radius adjustable coupler gyrator position calibrator parallelly positioned in relation to said platen (111), or even at least one radius adjustable coupler gyrator position calibrator responsive to said radius adjustable coupler controller (112) as well as at least one radius adjustable coupler gyrator position calibrator responsive to at least one output parameter (113) may include perhaps a servo motor that causes a rotatable threaded track (96) to rotate in a forward or reveres direction. As the rotatable threaded track (96) rotates, an adjustable non-rotational gyrator support guide track attachment (100) which may have corresponding threads moves along the guide track positioning the gyrator along the radius of a rotating platen.

As shown in FIGS. 2 and 3, multiple radius adjustable coupler gyrator position calibrator (110) elements may be utilized. For example a plurality of synchronized radius adjustable coupler gyrator position calibrators (116), which in some embodiments may include a plurality of servo motors positioned at either end of a radius adjustable coupler drive shaft guide track (95) that simultaneously and in a synchronized manner rotate a radius adjustable coupler drive shaft guide track (95) or all-thread rod (97) positioned parallel in to a rotating platen. As the radius adjustable coupler drive shaft guide track (95) or all-thread rod (97) is rotated in a forward or backward orientation, a threaded adjustable non-rotational gyrator support guide track attachment (100) coordinated with a gyrator may move up and down the guide track. In an alternative embodiment the inventive technology may encompass a plurality of opposed radius adjustable coupler gyrator position calibrators (117) where for example a servo motor is placed at both ends of a guide track and with one servo motor rotating a guide track in a forward direction while another servo motor rotates the guide track in a backward direction allowing for the calibration of a gyrator across the face of a platen.

As discussed previously, in certain embodiments of the current inventive technology a gyrator (84) may be loaded onto a rotating platen. As previously described, a gyrator being coupled to a generator provides a resistance or load to the rotational movement of the platen. It may be desired to adjust the load the gyrator places onto the rotating platen to, for example adjust the rotational velocity of the platen itself, the gyrator, multiple engaged gyrators, or perhaps to control, maintain or adjust generator RPM and/or electrical output. To accomplish this, at least one radius adjustable coupler gyrator load adjustor (102) may be incorporated in the current inventive technology to adjust the load for example a gyrator places on a rotating platen. In some instances this radius adjustable coupler gyrator load adjustor (102) may comprise a brake mechanism, such as a disk brake and/or a hydraulic brake mechanism as well as perhaps another friction creation device that may reduce the gyrators ability to rotate freely and thereby increase the load a gyrator places on the rotating platen reducing its overall rotational speed. In other instances, said adjustable coupler gyrator load adjustor (102) may comprise for example a hydraulic compression and/or braking device that may load and/or press the gyrator down with more force increasing the total load force on the rotating platen. This element may form part of a feedback loop that may be used to increase and/or decrease the load force on the rotating platen which in turn may be used to regulate the rotational speed of the accompanying elements such as a drive shaft and/or wind responsive blades for example. In this manner the resistance inherent in the generator, or load adjustor generated by the gyrator or other elements can be used to maintain constant generator RPM for example. This gyrator load feedback loop may be used to maintain the rotational speed of the platen among other elements so as to allow for the fine calibration of the system resulting in the constant generator RPM and constant or optimal electrical output. This feedback loop may be especially helpful in high wind situations where the rotational velocity of a platen may reach speeds that may cause a radius coupled generator to operate at sub-optimal RPM. In this situation, such a gyrator load feedback loop may be utilized increase the load on the platen, allowing for a reduction in the rotational velocity of a gyrator or multiple gyrators thereby reducing the operating RPM of any coupled generators under high wind conditions.

Further embodiments may include at least one radius adjustable coupler gyrator load adjustor responsive to at least one output parameter (103). Further embodiments include at least one radius adjustable coupler gyrator load adjustor responsive to at least one radius adjustable coupler controller (104).

In some embodiments it may be desired to pre-load the gyrator, or in other words initiate its rotation prior to loading it onto a rotating platen. In such an instance, some embodiments of the current inventive technology may include at least one radius adjustable coupler gyrator pre-load adjustor (105). Such an element may include for example at least one radius adjustable coupler gyrator pre-load driver (106) which may include a motor coordinated with a gyrator that may drive the gyrator causing it to rotate. In some instances the rotational velocity of the gyrator may be synchronized with the rotational velocity of the platen so that when the gyrator is engaged they are perhaps rotating at approximately the same speed. This may be additionally beneficial so as to reduce turbulence, frictional and/or vibrational movement and allows for a smooth load transition as a gyrator is loaded onto the rotating platen. Further embodiments may contemplate at least one radius adjustable coupler gyrator pre-load adjustor responsive to at least one output parameter (107). As discussed, it may be desirable to smoothly load said gyrator onto said platen. To dampen any transitional turbulence and any frictional and/or vibrational movement certain embodiments include at least one radius adjustable coupler gyrator shock absorber (108). In still other embodiments the inventive technology may include at least one radius adjustable coupler gyrator brake (109) which may stop or reducing the gyrators rotation while it is in contact with the platen or after it has been disengaged and is no longer in contact with the platen. This brake may also represent a load that may be placed on for example a rotating platen to adjust its rotational velocity. In another embodiment, said radius adjustable coupler gyrator load adjustor (102) may include perhaps a generator field adjustor such that the field of a generator may be adjusted such that for example in a first embodiment, the generator field is turned off reducing that generators resistance load to zero, at which point a gyrator may be loaded onto for example a platen by a radius adjustable coupler in an open position, or a state of load free rotation. As the gyrator begins to rotate, a radius adjustable coupler gyrator load adjustor (102) may adjust the field strength to a pre-determined or desired level increasing the load placed on the platen through the radius adjustable coupler gyrator. In some embodiments this field may be maintained at a constant, while in other embodiments it may be reduced only for a time sufficient to load a gyrator onto a platen utilizing a radius adjustable coupler before being returned to a pre-determined level.

As discussed previously, certain elements of said radius adjustable coupler may be established so as to be positioned parallel with a platen. In some embodiments, as shown in FIGS. 2 and 3, elements of said radius adjustable coupler are positioned above (as well as perhaps below in other embodiments) and extending over a rotating platen. To facilitate this positioning of various elements, embodiments of the inventive technology may comprise at least one radius adjustable coupler support mount (69). Such a support mount may further comprise at least one extendable adjustable radius adjustable coupler support mount parallelly positioned to said at least one platen (71), while in some embodiments it may be positioned perpendicularly or at a plurality of other angles and/or orientations. Additional embodiments may include at least one extendable radius adjustable coupler support mount (70) such that the support mount may be extended or retracted as it is positioned relative to a rotating platen. Still further embodiments may include at least one extendable adjustable radius adjustable coupler support mount support (72) such that the support mount may be adjustable in a plurality of directions as well as being supported by perhaps hydraulic or other supports or stabilizers to reduce and/or eliminate vibration, or frictional energy loss. In some other embodiments, as will be discussed below said support mount coordinating various elements of said radius adjustable coupler (4) may be adjusted, perhaps on a swivel to perhaps allow individual generators to be removed and/or moved from their operational positions for service, maintenance or repair. Examples may include perhaps at least one extendable adjustable radius adjustable coupler support mount support selected from the group consisting of: at least one extendable adjustable radius adjustable coupler support mount bearing support, at least one extendable adjustable radius adjustable coupler support mount hydraulic support, at least one extendable adjustable radius adjustable coupler support mount bolt support, at least one extendable adjustable radius adjustable coupler support mount latch support, and at least one extendable adjustable radius adjustable coupler support mount detachable support (73).

As shown in the presented figures the current wind power generation system includes at least one generator responsive to said radius adjustable coupler (5). As has been discussed, the current inventive technology may include a variety of configurations. Certain embodiments may include a plurality of horizontally positioned generators responsive to a plurality of radius adjustable couplers (118) while other embodiments may include a plurality of circularly positioned generators responsive to a plurality of radius adjustable couplers (119). As discussed, a plurality of platens in a variety of configurations is encompassed in the various embodiments of the current inventive technology. Embodiments may include a plurality of vertically stacked generators responsive to a plurality of radius adjustable couplers (120). In some instances this vertically stacked configuration may include a plurality of vertically stacked generators positioned at various levels responsive to a plurality of radius adjustable couplers that may further be coordinated with a plurality of rotating platens perhaps. In some embodiments, as discussed above, said rotating platens may rotate independently and may be stacked one on top of another. In some embodiments, as wind velocity increases, the independent platens are perhaps sequentially engaged thereby increasing the total number of generators that may be coupled decreasing the total space needed as these elements may be placed underground for example in a mounted base pod (17). In addition to this configuration, the above mentioned configurations allows for an additional mechanism for generator control, generator RPM control, load control, electrical output control as well as the other benefits outlined above. Certain embodiments may also include at least one approximately at least 1800 RPM/355 KW generator responsive to said radius adjustable coupler (121) and/or at least one approximately at least 1800 RPM/1000 KW generator responsive to said radius adjustable coupler (122). As can be naturally deduced, a multiplicity of different generators representing a wide range of operating thresholds, optimal RPM, KW generation, capabilities, parameters and capabilities may be use with the current wind power generation system due to it's unique coupling system.

As discussed in some instances, it may be desired to disconnect various elements of the current wind power generation system perhaps for repairs or to adjust the load placed on a rotating platen or other element. In certain embodiments the current inventive technology may include for example at least one generator disconnect (123). Such a disconnect may for example in some embodiments include at least one automatic generator disconnect responsive to at least one output parameter (124) such that a generator or plurality of generators are automatically disconnected so they are no longer generating an electrical current. In some embodiments said disconnect may in fact reduce or eliminate the field or stator current within the generator so that the generator may remain coupled to for example a rotating platen. In this state the generator's drive shaft is rotating, which in turn rotates the rotor within the generator's stator, but since there is no equivalent field applied within the generator no electrical output is generated. In addition, since the rotor within the generator is rotating with no resistance, this configuration may be considered open as no resistance is being applied; conversely no load is applied to, for example a radius adjustable coupler (4), a platen (51) or other system elements.

In some instances this may include and at least one automatic generator disconnect responsive to said at least one radius adjustable coupler controller (125). Further embodiments may include at least one manual generator disconnect (125a) which may be controlled by an operator.

As discussed previously, one of the many features of the current inventive technology includes the ability to operate and generate an industrially useful electrical output at a range of wind velocities and blade and/or turbine RPM that may be outside the operational thresholds of traditional wind power generation systems. As touched upon previously, traditional wind power generation system must often reach a threshold RPM to begin generating an electrical output (6). Many traditional systems generally must achieve at least 12 blade RPM to begin generating an electrical output. Conversely, traditional systems generally cannot generate an electrical output at high wind velocities as their blade RPM cannot be sufficiently controlled/geared and in most cases the associated generator drive shaft rotates too fast for the generator to effectively generate an electrical output. The current inventive technology overcomes these limitations increasing its functional utility and economic desirability in the marketplace.

Further as discussed previously, the ability to engage or load onto a platen, through at least one radius adjustable coupler a single or plurality of generators responsive to said radius adjustable coupler (5), the current inventive technology allows for the generation of an electrical output at low wind velocity or low wind energy as well as during low blade RPM. In addition, the current inventive technology allows for the generation of an electrical output at high wind velocity or high wind energy as well as maintaining an optimal or load-regulated blade RPM allowing for an electrical output to be generated during high wind conditions.

As such, embodiments of the current inventive technology may include at least one load controlled low wind energy capture element (126) where, in some embodiments the load placed onto for example a rotating platen by at least one radius adjustable coupler (4) may facilitate in the generation of an electrical output under low wind conditions. Such low wind conditions may be considered to be wind velocities below 12 miles per hour for example. In addition, certain embodiments allow for the generation of an electrical output which may be loaded for example onto a grid at low blade RPM. As such the current inventive technology may include at least one load controlled low variable pitch blade RPM electrical output (127) which may further include at least one approximately at least 2.0-6.0 variable pitch blade RPM electrical output (129). Further embodiments may include approximately at least 12 or less miles per hour wind velocity variable pitch blade electrical output (128). This ability to regulate and/or control the movement, load and/or rotational velocity of various elements of the current inventive technology allows for the ability to generate a commercially/industrial electrical output (6) at a range of wind velocities and blade RPM not achievable by other wind power generation systems commercially available or known within the art.

As stated previously, one of the goals of the current inventive technology is to couple, in some instances a plurality of generators to a rotational element through a plurality of individual radius adjustable coupler(s) (4). As discussed above the ability to control the rotational movement and/or load on individual elements of the current system through individual coupling and/or decoupling as well as placement and movement of a gyrator on the face of a rotating platen to position(s) of varying rotational velocity, allows for the control of the electrical output of said generator(s) responsive to said radius adjustable coupler (5). In some embodiments this control may include the ability to generate at least one constant generator RPM electrical output (130). Such generator output may be in some cases dependant on the operational threshold and parameters of an individual generator. In some embodiments, various disparate generators that operate at a variety of RPM and have a variety of different KW electrical output capacity may be utilized at the same time. One of the advantages of this is that disparate make and model generators may be individually coupled for example to a rotatable platen though at least one radius adjustable coupler (4) and be maintained a constant generator electrical output as well as constant generator RPM even as various output parameters modulate. Some embodiments of the current inventive technology may include at least one constant generator RPM electrical output approximately at least above 3 miles per hour wind velocity (131) while still further embodiments may include approximately at least constant 1800 generator RPM electrical output (132) and/or approximately at least 1800 generator RPM electrical output above approximately at least 3 miles per hour wind velocity (133) as well as at least one approximately at least constant 1800 RPM multi-generator electrical output above approximately at least 5 miles per hour wind velocity (135).

As discussed previously, the current system allows for a plurality of generators to be engaged and/or disengaged, sometimes in a sequential manner in response to an output parameter or change in output parameter and as such, certain embodiments may include for example a constant multi-generator RPM electrical output (134). In some embodiments, each generator may be maintained or adjusted to maintain a pre-determined electrical output and/or RPM regardless of fluctuations in any output parameter such as wind velocity or direction. In still further cases, disparate make and model generators may be maintained at varying electrical outputs and/or RPM dependant on the optimal operational parameters of each generator regardless of fluctuations in any output parameter such as wind velocity or direction.

As alluded to previously, the current system includes in some embodiments at least one multi-generator load increased low wind radius adjustable coupler electrical output (136) such that the current wind power generation system may generate a commercial/industrial electrical output at a variety of wind velocities including low wind velocities which may include wind velocities below 12 miles per hour. As can be deduced from this disclosure, the electrical output generated from this current system may be derived in some embodiments from a plurality of generators responsive to said radius adjustable coupler(s) (5) and that in some embodiments each radius adjustable coupler (4) may, through the loading of a gyrator (84) place an increasing load on the system. Inherent in the current technology is the ability to manipulate that load at a variety of discrete points throughout the system as herein described allowing for an electrical output (6) at wind velocities perhaps below 12 miles per hour. Further embodiments may include at least one approximately at least 335 KW-1670 KW electrical output generated approximately at least below 12 miles per hour wind velocity (137).

One aspects on the current wind power generation system as discussed is the ability to sequentially load additional generators, through a plurality of radius adjustable coupler(s) (4) onto for example a platen (84). This step-wise load increased technology allows for an electrical output to be generated and optimized even as output parameters such as wind velocity fluctuate. Such a step-wise electrical output may follow a generally linear progression and/or increase as for example wind velocity or other output parameters fluctuate. As such, various embodiments of the current inventive technology may include methods and apparatus for at least one step-wise multi-generator load increased low wind radius adjustable coupler electrical output selected from the group consisting of:

A 1st generator, approximately at least 3 MPH wind velocity, and at least one electrical output approximately at least 335 KW electrical output;

A 1st & 2nd generator, approximately at least 5 MPH wind velocity, and at least one electrical output approximately at least 670 KW electrical output;

A 3rd generator, approximately at least 7 MPH wind velocity, and at least one electrical output approximately at least 1000 KW electrical output;

A 1st & 3rd generator, approximately at least 9 MPH wind velocity, and at least one electrical output approximately at least 1335 KW; and A 1st & 2nd & 3rd generator, approximately at least 11 MPH wind velocity, and at least one electrical output approximately at least 1670 KW (138)

Consistent with the above discussion, embodiments of the current inventive technology may include at least one intermediate wind energy capture element (139), where in this case intermediate wind energy may be considered wind (or other fluid dynamic) velocities approximately at least 13 miles per hour to approximately at least 15 miles per hour. Again consistent with the discussion above, embodiments of the current system may include at least one multi-generator load increased intermediate wind radius adjustable coupler electrical output (140) and/or at least one approximately at least 2000 KW-2335 KW electrical output generated approximately at least between 13-15 miles per hour wind velocity (141).

Again, the current wind power generation system encompasses a step-wise load increased technology which allows for an electrical output to be generated and optimized even as output parameters such as wind velocity fluctuate across an intermediate wind velocity range. As such various embodiments of the inventive technology may comprise at least one step-wise multi-generator load increased intermediate wind radius adjustable coupler electrical output selected from the group consisting of:

A 3rd & 4th generator, approximately at least 13 MPH wind velocity, and at least one electrical output approximately at least 2000 KW; and A 1st & 3rd & 4th generator, approximately at least 15 MPH wind velocity, and at least one electrical output approximately at least 2335 KW (142).

Again, consistent with the above discussion, embodiments of the current inventive technology may include at least one high wind energy capture element (143), where in this case high wind energy may be considered wind (or other fluid dynamic) velocities approximately at least 17 miles per hour and above. Again consistent with the discussion above, embodiments of the current system may include at least one multi-generator load increased high wind radius adjustable coupler electrical output (144), and/or at least one approximately at least 2000 KW-2335 KW electrical output generated approximately at least between 17-61 miles per hour wind velocity (145).

Again, the current wind power generation system encompasses a step-wise load increased technology which allows for an electrical output to be generated and optimized even as output parameters such as wind velocity fluctuate across a high wind velocity range. As such various embodiments of the inventive technology may comprise at least one step-wise multi-generator load increased high wind radius adjustable coupler electrical output selected from the group consisting of:

A 1st & 2nd & 3rd & 4th generator, approximately at least 17 MPH wind velocity, and at least one electrical output approximately at least 2670 KW;

A 3rd & 4th & 5th generator, approximately at least 19 MPH wind velocity, and at least one electrical output approximately at least 3000 KW;

A 1st & 3rd & 4th & 5th generator, approximately at least 21 MPH wind velocity, and at least one electrical output approximately at least 3335 KW;

A 1st & 2nd & 3rd & 4th & 5th generator, approximately at least 23 MPH wind velocity, and at least one electrical output approximately at least 3670 KW;

A 3rd & 4th & 5th & 6th generator, approximately at least 25 MPH wind velocity, and at least one electrical output approximately at least 4000 KW;

A 1st & 3rd & 4th & 5th & 6th generator, approximately at least 27 MPH wind velocity, and at least one electrical output approximately at least 4335 KW;

A 1st & 2nd & 3rd & 4th & 5th & 6th generator, approximately at least 29 MPH wind velocity, and at least one electrical output approximately at least 4670 KW;

A 3rd & 4th & 5th & 6th & 7th generator, approximately at least 31 MPH wind velocity, and at least one electrical output approximately at least 5000 KW;

A 1st & 3rd & 4th & 5th & 6th & 7th generator, approximately at least 33 MPH wind velocity, and at least one electrical output approximately at least 5335 KW;

A 1st & 2nd & 3rd & 4th & 5th & 6th & 7th generator, approximately at least 35 MPH wind velocity, and at least one electrical output approximately at least 5670 KW;

A 3rd & 4th & 5th & 6th & 7th & 8th generator, approximately at least 37 MPH wind velocity, and at least one electrical output approximately at least 6000 KW;

A 1st & 3rd & 4th & 5th & 6th & 7th & 8th generator, approximately at least 39 MPH wind velocity, and at least one electrical output approximately at least 6335 KW;

A 1st & 2nd & 3rd & 4th & 5th & 6th & 7th & 8th generator, approximately at least 41 MPH wind velocity, and at least one electrical output approximately at least 6670 KW;

A 3rd & 4th & 5th & 6th & 7th & 8th & 9th generator, approximately at least 43 MPH wind velocity, and at least one electrical output approximately at least 7000 KW;

A 1st & 3rd & 4th & 5th & 6th & 7th & 8th & 9th generator, approximately at least 45 MPH wind velocity, and at least one electrical output approximately at least 7335 KW;

A 1st & 2nd & 1st & 3rd & 4th & 5th & 6th & 7th & 8th & 9th generator, approximately at least 47 MPH wind velocity, and at least one electrical output approximately at least 7670 KW;

A 3rd & 4th & 5th & 6th & 7th & 8th & 9th & 10th generator, approximately at least 49 MPH wind velocity, and at least one electrical output approximately at least 8000 KW;

A 1st & 3rd & 4th & 5th & 6th & 7th & 8th & 9th & 10th generator, approximately at least 51 MPH wind velocity, and at least one electrical output approximately at least 8335 KW;

A 1st & 2nd & 3rd & 4th & 5th & 6th & 7th & 8th & 9th & 10th generator, approximately at least 53 MPH wind velocity, and at least one electrical output approximately at least 8670 KW;

A 3rd & 4th & 5th & 6th & 7th & 8th & 9th & 10th & 11th generator, approximately at least 55 MPH wind velocity, and at least one electrical output approximately at least 9000 KW;

A 1st & 3rd & 4th & 5th & 6th & 7th & 8th & 9th & 10th & 11th generator, approximately at least 57 MPH wind velocity, and at least one electrical output approximately at least 9335 KW;

A 1st & 2nd & 3rd & 4th & 5th & 6th & 7th & 8th & 9th & 10th & 11th generator, approximately at least 59 MPH wind velocity, and at least one electrical output approximately at least 9670 KW;

A 3rd & 4th & 5th & 6th & 7th & 8th & 9th & 10th & 11th & 12th generator, approximately at least 61 MPH wind velocity, and at least one electrical output approximately at least 10,000 KW;

A 1st & 3rd & 4th & 5th & 6th & 7th & 8th & 9th & 10th & 11th & 12th generator, approximately at least 63 MPH wind velocity, and at least one electrical output approximately at least 10,335 KW; and A 1st & 2nd & 3rd & 4th & 5th & 6th & 7th & 8th & 9th & 10th & 11th & 12th generator, approximately at least 65 MPH wind velocity, and at least one electrical output approximately at least 10,670 KW (146).

As is evident from the claims, apparatus and methods of wind power generation are both contemplated in this application. As seen in the corresponding method claims, each of the above described embodiments may include the step(s) of engaging the above described generator(s) according to a corresponding wind velocity which may additionally correspond to a multi-generator load increasing radius adjustable coupling electrical outputting as indicated.

Further embodiments may additional include at least one step-wise multi-generator stacked load wind energy radius adjustable coupler electrical output (147). In such an embodiment, a plurality of generators for example may be sequentially loaded or in other words loaded in a step-wise manner in response to an output parameter such as increasing wind velocity onto for example a platen. Further, as discussed previously, certain embodiments may include multiple platens coordinated with a plurality of generators by a plurality a radius adjustable coupler(s) (4), which as described above may be stacked vertically and mechanically coordinated (independently or synchronously) with at least one rotatable drive shaft (37). In such an arrangement, in response to an output parameter, a controller may load, through at least one radius adjustable coupler (4) onto at least one platen in a step-wide or sequential manner a plurality of stacked generators responsive to said radius adjustable coupler (5). In such a manner, the number of generators that may be used with the current system can increase with a corresponding increase in electrical output capacity with minimal increases in cost, wind energy required as well as physical footprint.

As discussed previously, it may be desired to disconnect and remove perhaps individual generators from the current wind power generation system. In certain embodiments, as have been discussed individual generators may be individually disconnected or otherwise brought off-line and in some cases physically removed while other generators continue generating an electrical output. This is one of the major inventive steps forward the current system represents, in that as opposed to commercially available traditional single generator systems, that sometimes must be entirely shut-down for repairs and/or maintenance, the current wind power generation system encompassed in this application may continue to operate, perhaps with multiple generators, while for example a malfunctioning generator may be disconnected and/or otherwise brought off-line and repaired. In some instances it may be desired to lift a single or multiple generators from their respective operational position and bring them to a servicing position where they can be more efficiently repaired, and perhaps replaced with a functional generator so that the system is constantly operating with an optimal number of generators.

To accomplish this, various embodiments of the current inventive technology may include at least one adjustable generator release system (148), which may be responsive to a controller or perhaps an output parameter. As shown in FIG. 1, a generator, perhaps in need of maintenance or cleaning may be lifted from an operational position by at least one adjustable generator hoist (149). In some embodiments said generator may be secured to said adjustable generator hoist (149) by at least one adjustable generator hoist fastener (150) which may include but not be limited to at least one adjustable generator hoist fastener selected from the group consisting of: at least one adjustable generator hoist snap fastener, at least one adjustable generator hoist screw fastener, at least one adjustable generator hoist clamp fastener, at least one adjustable generator hoist ring fastener, at least one adjustable generator hoist hook fastener, at least one adjustable generator hoist quick release fastener (151).

As discussed previously, it may be desired to move a generator from an operational position to perhaps at least one generator off-load service placement position (155) which may be a separate housing that is specially designed to provide a service bay or area where generators may be serviced, cleaned or repaired. To facilitate the movement between these two positions a generator that has been released and hoisted may slide to, for example a generator off-load service placement position (155) sliding along at least one adjustable hoist guide rail (152) as shown in FIG. 1. Further embodiments may include at least one adjustable hoist guide rail generator shunt (154) where such a shunt may include a transfer interchange connection along said adjustable hoist guide rail (152) where a hoisted generator for example may be shunted to a different position, for example a waiting position while perhaps allowing for multiple generators to be sliding along the rail in different directions. In further embodiments a new or repaired generator may be loaded onto an adjustable hoist guide rail generator shunt (154) and then be transferred to an adjustable hoist guide rail (152) prior to being placed into an operational position. In further embodiments this adjustable hoist guide rail generator shunt (154) may allow for a hoisted generator to be shunted and brought to a generator off-load service placement position (155) which may be off-site.

Such a rail may be positioned above a generator responsive to said radius adjustable coupler (5) and further may be circularly positioned above said generator responsive to said radius adjustable coupler (5) and be secured into the mounted base pod (17). Embodiments may include but are not limited to at least one adjustable generator hoist selected from the group consisting of: at least one adjustable generator mechanical hoist at least one adjustable generator pulley hoist, at least one adjustable generator roller hoist, at least one adjustable generator magnet hoist, at least one adjustable generator hydraulic hoist, at least one adjustable generator hoist motor (153).

Certain embodiments of the current inventive technology describe methods and apparatus for a wind power generation system generally comprising: at least one wind responsive turbine (1); at least one mechanical connection (2); at least one rotational movement element configured to be responsive to said mechanical connection (3); at least one continuum coupler (156); at least one generator responsive to said continuum coupler (157); and an electrical output (6).

As discussed previously, one of the many stated goals of the current inventive technology is to provide a wind power generation system that coupler controls the electrical output, generator RPM and other operational system characteristics. The current inventive technology, in some embodiments may include at least one continuum coupler (156). This continuum coupler (156) may include a coupler that may connect for example at least one rotational movement element configured to be responsive to said mechanical connection (3) and at least one generator responsive to said continuum coupler (157) such that the generator's operational parameters such as RPM and electrical output may be controlled by a continuum coupler (156). In further embodiments a continuum coupler (156) may couple a rotational element and a generator along a continuum. In some embodiments such a continuum may represent a continuum of rotational velocities (or in other embodiments a continuum along a straight line, velocity, generator RPM, electrical output, oscillation, movement, momentum, radius, diameter, circumference or any other continuum where a gradation of values or characteristics may occur and the like) along the face of a rotating rotational movement element. For example, in some embodiments said continuum coupler (156) may couple a generator to a position along a rotational movement element that corresponds to a specific rotational velocity that produces a desired generator RPM and/or electrical output. In still further embodiments, said continuum coupler (156) may adjust and/or accommodate its location along a continuum to a position of different rotational velocity according to an output parameter, operator's desire and/or to maintain a desired generator RPM and/or electrical output. In still further embodiments, multiple continuum couplers (156) may couple a plurality of generators to a single or in some cases a plurality of rotational movement elements such that the generators may be coupled at desired positions along a continuum for example a rotational velocity continuum on a rotational movement element. As such, the current inventive technology describes apparatus and methods for controlling the generator RPM, and/or generator's electrical output through positioning and adjusting and/or accommodating a continuum coupler (156) along a continuum. As one skilled in the art will appreciate, the ability to control, manipulate, optimize and fine-tune the operational characteristics/output parameters of a wind power generation system through a coupler addresses a long felt need within the industry, and represents an inventive leap forward within the field of power generation. Various embodiments or the current inventive technology will be taken up in turn.

As opposed to traditional wind power generation systems which may use conventional gearing to produce an interrupted electrical output. Embodiments of the current inventive technology may also include an uninterrupted transformation dynamic (158). In certain embodiments for example a continuum coupler (156) may be coupled to for example at least one generator responsive to said continuum coupler (157) such that the generator may generate an electrical output in an uninterrupted dynamic fashion. In such an embodiment a continuum coupler (156) may innervate a generator or in some embodiments a plurality of generators such that their singular and/or collective electrical outputs and/or RPM may be controlled. In still further embodiments, this continuum coupler (156) control allows for an uninterrupted increase, decrease and/or maintenance of an electrical output, generator RPM and/or other operational characteristic from said wind power generation system responsive to said continuum coupler (157). Additional embodiments of the current inventive technology may also include at least one non-discrete continuum coupler (159). In some embodiments such a non-discrete continuum coupler (159) may comprise a coupler that may be dynamic in its coupling in that it may be placed and freely adjust to a variety of positions along a continuum. As such, the current inventive technology may include a continuous and dynamic electrical output controlled by a continuum coupler (156).

As discussed previously, certain embodiments of the current inventive technology may include a continuum coupler (156) that may couple a generator with other elements of the current wind power generation system along a continuum, which may represent a gradation of values such as perhaps rotational velocity. Further embodiments of the current inventive technology may include at least one infinitely dynamic coupler element (160). In such an embodiment said continuum coupler (156) may be freely positioned and adjusted and/or accommodated along a continuum. In some embodiments such dynamic positional changes may result in a dynamic system change perhaps resulting in a dynamic electrical output, a dynamic generator RPM, a constant electrical output and/or a constant generator RPM and the like. Positional changes by a continuum coupler (156) along such a continuum may represent a non-finite number of positions along a continuum that may be dynamically coupled to a generator(s). Still further embodiments may include at least one fully adjustable continuum coupler (161), such that said continuum coupler (156) may be fully adjustable along the entire range of a continuum. Further embodiments may include a non-discrete range of adjustment (162), where perhaps said continuum coupler (156) may be coupled at, and freely adjusted to any position along a continuum such that for example generator RPM and generator electrical output may remain constant and/or optimized despite changes in any output parameters such as wind velocity. For example, in some embodiments said continuum coupler (156) may couple a generator to a rotational velocity continuum which may be established by the rotation of a rotational movement element configured to be responsive to said mechanical connection (3). In such a configuration, in some embodiments said continuum coupler (156) may freely adjust to a non-finite number of non-discrete positions along the continuum such that the generator(s) electrical output and/or generator(s) RPM are maintained at a desired or optimized level. In some embodiments a non-discrete range of adjustment for said continuum coupler (156) may be a range varying approximately 0.1-14 feet (163). These embodiments allow for the electrical output, generator RPM and other operational characteristics to be controlled at the coupler level by a continuum coupler (156) dynamically and continuously adjusting along a continuum.

Additional embodiments of the current inventive technology may include at least one rotational element (164) which may include a rotational element for example that may be connected to a continuum coupler (156) that may be coupled to a continuum. In one such embodiment a rotational element (164) may include a gyrator that may be connected to a continuum coupler (156) and may be placed onto continuum. In some embodiments this continuum may be a rotational velocity continuum created from the rotation of at least one rotational movement element configured to be responsive to said mechanical connection (3). In this configuration, the rotational element (164) rotates approximately at the same velocity as the rotational velocity of the rotational movement element and this rotational energy is transferred through the coupler to a generator driving that generator. Said rotational element (164) may be dynamic, in that it can be adjusted along the entire continuum, in this case to a position of low or high continuum gradation value. In some embodiments said rotational element (164) is adjusted to a position of rotational velocity, that allows for a coupled generator for example to be maintained at a constant electrical output and/or RPM. In other embodiments, at least one rotational element (164) that is placed into contact with a continuum and is coupled with a generator may produce a load on that continuum. As such, it may be desired to alter the continuum, for example to reduce the rotational speed of a rotational movement element configured to be responsive to said mechanical connection (3). (In some cases the load may be created by the mechanical resistance, field resistance and/or inertia necessary to operate the generator as well as perhaps mechanical friction from weight, or brakes coordinated with said rotational element (164) and/or continuum coupler (156)). In certain embodiments at least one rotational element (164) may be placed into contact with the continuum exerting a load on that continuum such that the continuum is altered. In a preferred embodiment, a load is placed into a rotational movement element through at least one rotational element (164) connected with a continuum coupler (156) such that the increased load causes the rotational movement element to slow, resulting in an altered and/or reduced rotational velocity continuum. In these various embodiments, the generator output, and operational characteristics of the current system are load controlled along a continuum by least one continuum coupler (156).

Additional embodiments of the current inventive technology may include a fully connected set of gearing ratios (165). Where, as discussed previously, a continuum coupler (156) may couple at least one generator to a continuum such that the generator is operated at, or maintained at a desired operational level and that the continuum coupler (156) does not need to disengage with the continuum, but merely may adjust or accommodate to a different position along that continuum where for example the continuum gradient value, such as rotational velocity is higher or lower. The continuum coupler (156) may maintain constant contact with the continuum such that each position along the continuum represents a gearing ratio in that each position along the continuum may have a distinct gearing effect for example on a coupled generator. In the current inventive technology said gearing ratios (without the use of traditional gear mechanism) are fully connected and represent a continuum of gearing ratios (166). In certain embodiments a continuum coupler (156) may, perhaps through a rotational element (164) couple a generator to a continuum at a position that represents a specific gearing ratio (which for example may represent a rotational velocity that drives a coupled generator at a discrete RPM or produces a specific electrical output). The continuum coupler (156) may freely move along the continuum and/or continuum of gearing ratios (166) with each position representing a specific gearing ratio that can produce a specific desired output. Such movement along the continuum may be in response to an output parameter or pre-determined operational characteristic.

Consistent with the discussion above, additional embodiments of the current inventive technology may include at least one mechanical continuum transposition coupler (167). In this embodiment, a generator may be coupled to a continuum through at least one mechanical continuum transposition coupler (167). As discussed previously, one aspect among many of the current inventive technology may include a continuum of gearing ratios that may be coupled to at least one generator through a continuum coupler. Certain embodiments may include at least one mechanical continuum transformation ratio coupler (168), where a mechanical continuum transposition coupler (167) may couple a generator to a continuum and where said mechanical continuum transposition coupler (167) may be maintained in continuous contact with said continuum. Consistent with the above mentioned embodiments, the mechanical continuum transposition coupler (167) may be adjusted and/or accommodated along the continuum which in turn controls in some cases a generator's electrical output, RPM, or other operational characteristic of the system.

In certain embodiments, wind energy, or another fluid dynamic such as water or perhaps steam as discussed above may innervate at least one wind environment continuum power transmission element (169). Such an element may include a single or plurality of mechanical devices and/or connections that are capable to collecting for example wind or fluid dynamic energy, and transmitting that kinetic energy mechanically through the current wind powered generation system. Such transmission of energy may be through rotation, oscillation, or other unidirectional or multi-directional movement and/or gearing. In certain other embodiments said transmission of energy may be transmitted though at least one angled gear element (170). In some embodiments such an angled gear element allows for the directional change in kinetic energy transmission. In some embodiments such elements(s) may include mechanical devices, couplers gears and/or gearing systems that may be unidirectional or multi-directional in nature. Such angled gear element(s) (170) may generally be responsive to an output parameter, such as wind velocity.

Embodiments of the current inventive technology may include at least one platen transformation element (172). Some embodiments of a platen transformation element (172) may include a mechanical device that is connected, perhaps mechanically to a platen. Such a platen as described above may transform the platen in response to the movement or rotation of such a platen transformation element (172). Such transformation may include rotating, oscillating, stopping, moving, or any other type of physical transformation. In some embodiments said platen transformation element (172) may include a drive shaft that may transmit wind derived energy from at least one angled gear element (170) to a platen.

Further embodiments may include at least one ground environment power transmission element continuum coupler (171). In certain embodiments, as discussed above for example wind energy or other fluid dynamic is captured by a wind environment continuum power transmission element (169), transmitted to at least angled gear element (170) which is further transmitted to at least one platen transformation element (172) causing a platen transformation, such as rotational movement. Further, at least one ground environment power transmission element continuum coupler (171) may be positioned so as to couple for example a continuum, located perhaps along the surface of a rotating platen with a generator. This ground environment power transmission element continuum coupler (171) may allow for the wind derived kinetic energy to be transmitted to, and drive said generators.

As discussed previously, said mechanical continuum transposition coupler (167) may control generator electrical output, RPM and/or other system operational characteristics. In certain embodiments, said continuum may fall along the radius of a rotational element. As discussed above, certain embodiments of the current inventive technology may include at least one platen that may be mechanically coordinated with at least one platen transformation element (173). In a preferred embodiment the platen transformation element (173), may transmit wind derived energy to a platen resulting in the rotation of a platen (174). In still further embodiments, said platen transformation element (173) may be mechanically attached to said platen such that as it begins to move, or perhaps rotate in response to transmitted wind energy, the connected platen moves as well. Additionally, as discussed previously, said platen may be substantially round in shape, and as the laws of physics dictate will have a higher rotational velocity the further from its central rotating axis. As such, this rotating platen may contain a rotational velocity continuum, with a gradient of rotational velocities along the radius of the platen extending outward to the end. (It should be noted that said platen may be extendable or expandable so that additional gradient positions may be added or taken away as desired). In some instances, at least one gyrator (175) may be mechanically coordinated with at least one mechanical continuum transposition coupler (167) which may be loaded or positioned along the aforementioned rotational velocity continuum on said platen. As such, said gyrator begins to rotate corresponding with the rotational velocity of the platen where it is loaded on the continuum. In some embodiments, at least one continuum radius adjustor (176) may adjust or accommodate a gyrator (175), or perhaps a mechanical continuum transposition coupler (167) along the radius of the platen to a desired or optimal position along the continuum. In certain embodiments, as wind velocity increases, and the platen rotates faster, it may be desired to activate at least one continuum radius adjustor (176), and move a gyrator, that is connected to a mechanical continuum transposition coupler (167) which is in turn connected to and driving a generator, to a position along a continuum of lower rotational velocity. In such a case, a continuum radius adjustor (176) may adjust a gyrator (175) closer to the rotational axis of the platen, causing the gyrator's rotational velocity to slow, causing the generator responsive to said mechanical continuum transposition coupler (167) to slow, thereby reducing its electrical output, and RPM. It should be noted that this process may be reversed with a gyrator being adjusted to a position of higher rotational energy for example.

Consistent with the discussion above, certain embodiments of the current inventive technology may include at least one continuum load engager (177). Such a load engager, may being into contact for example a gyrator, or a mechanical continuum transposition coupler (167) with said platen (174). Such a continuum load engager (177) may be a mechanical device that may physically load the above described elements onto for example a rotating platen. Examples of such devices may include perhaps a simple clutch or other hydraulic mechanism or device.

As can be seen it may be necessary to control the various elements of the above described wind power generation system. In certain embodiments at least one continuum controller (178) may be utilized to sense, detect, engage, activate, deactivate or otherwise control the above described elements. In particular, in a preferred embodiment, said continuum controller (178) may detect and calculate the rotational velocity continuum of a rotating platen as well as detect the rotational velocity of for example a rotating gyrator, generator or other element. In addition, said continuum controller (178) may detect the electrical output and/or RPM of a generator or plurality of generators, and may controllably adjust any of the various elements of the system herein described to increase, decrease, and/or maintain optimal electrical output or generator RPM as well as other operational characteristics. In a preferred embodiment, said continuum controller (178) may sequentially load and unload as well as adjust the position along the continuum a single or plurality of gyrators connected to a single or plurality of mechanical continuum transposition couplers (167) as well as adjust their position along a continuum so as to for example adjust the systems electrical output, generator RPM or other operational characteristic. In some embodiments, such a controller may represent a novel and unique software/hardware solution.

As discussed previously, it may be desired to load and control a plurality of continuum coupled generators along a continuum. In some embodiments it may be desired to load multiple generators onto for example a rotational movement element such that the resistance inherent in the coupled generators may produce a load that may alter the rotational velocity of the rotational movement element, thereby altering the rotational velocity continuum. In such a manner, loading a plurality of continuum coupled generators onto a continuum represents a method of coupler control of the current wind power generation system. Consistent with this, embodiments of the current inventive technology may include at least one multi-generator load controller (179). Such a load controller may coordinate the load placed onto a continuum allowing load continuum coupler control of the current system as discussed above.

In addition, as discussed previously, it may be desired to move the coupling position of a continuum coupler along a continuum so as to utilize the specific gradation value at that position to control a generator. As such certain embodiments may include at least one continuity change element (180). Such an element may include a mechanical, motorized, hydraulic or other device that may adjustably and dynamically change the position of a continuum coupler while it remains in contact with a continuum. In this fashion, generator control may be achieved without a loss of continuity in the generator-coupler-continuum contact. In some further embodiments this movement as well as loading of multiple continuum couplers to a continuum may be synchronized according to a pre-determined specification and/or desired position. In other instances it may be synchronized so as to maintain continuity of generator electrical output, generator RPM as well as other operational characteristics. As such, embodiments of the current inventive technology may include at least one synchronized element (181) which may synchronize and/or coordinate the loading and un-loading of various continuum couplers as well as the individual couplers position along any given continuum.

As discussed previously, as wind velocity increases, for example a rotational velocity continuum is established along a continuum, for example along the face of a rotating platen. As it increases to a point, it may begin to rotate at such a speed so as to exceed a coupled generators operational threshold. As such it may be desirous to add additional load onto such a continuum to reduce its gradational values. To accomplish this, some embodiments may include at least one generator addition element (182). Such an element may load additional continuum coupled generators to a continuum which as previously described may alter the characteristics of the continuum which in turn alters a coupled generator's output. In such a manner additional continuum coupled generators may be added or removed as a method of continuum coupler controlling the current inventive technology.

As previously described, as a continuum coupled generator is loaded onto a continuum, it may be desired to move the continuum coupler contact to a different position along that continuum. As such, some embodiments of the current inventive technology may comprise at least one synchronized generator transformation element (183). In such an embodiment, this element allows for the positional transposition of one or multiple engaged continuum coupled generators along a continuum. Such movement along a continuum may be synchronous so as to maintain a generator's operational characteristics, such as electrical output and RPM. In addition, such movement along a continuum may be independent, such that each engaged continuum coupled generator may be individually maintained within or approximately at a desired operational range. In some embodiments this movement may include at least one multi-generator synchronized range (184) which may represent an approximate range a continuum coupler may move along the continuum. In some embodiments this range may include at least one multi-generator synchronized range varying approximately at least 0.1 to 14 feet (185).

As discussed previously, one of the many goals of the current invention is to provide a wind power generation system that may coupler control the electrical output, generator RPM as well as other operational characteristics of the system. To accomplish this goal, embodiments of the current inventive technology may include at least one constant generator output and/or RPM coupler (186). Such a constant generator RPM coupler may for example couple at least one rotational movement element configured to be responsive to said mechanical connection (3) and a generator and may be adjusted in such a manner so as to maintain a constant desired RPM. Such generator optimization is highly desired from a technological and economic perspective and may result in a constant optimized electrical output, which may further represent a constant electrical output that may be available to be outputted to a grid for use by consumers or other commercial uses.

As discussed previously, the ability to control a generator through a coupler represents a significant and unexpected leap forward in the field of power generation. Another aspect of this coupler control describes at least one variable load coupler (187). Consistent with previous discussions, a generator with an active field can provide a resistance to any rotational movement of its rotor located within a stator. This resistance as previously described may represent one example of a load and/or load force. In certain embodiments, such a variable load coupler (187) may be able to variably, and controllably apply that load or load force onto a continuum, for example a rotational velocity continuum created by the rotational movement of for example a rotating platen. This variable load may provide a resistance force on such a rotating platen causing it to slow. This slowing causes a shift in the continuum, where the overall rotational speed along the continuum is reduced. In some embodiments such a variable load coupler (187) may disengage a generator removing such a load force from for example a rotating platen, thereby reducing the load placed on the platen, causing it to increase it's rotational velocity. This increase in rotational velocity causes the rotational velocity continuum to shift in such a manner so as to represent a higher rotational velocity continuum. In this manner a variable load coupler (187) may control the generator derived load placed on certain elements of the wind power generation system. As such, a variable load coupler (187) represents a new and novel load control for the current system.

As previously discussed, in some embodiments, the current inventive technology may include a plurality of generators connected to corresponding couplers. In some instances, to achieve optimal coupler level control of a single or plurality of generators it may be desired to sequentially engage and/or disengage a plurality of couplers as herein described in a pre-determine sequence. In some instances this sequence may be dependant on an output parameter or perhaps changes or variations of an output parameter. It should be noted that such a coupler sequence is a dynamic sequence and may have multiple various embodiments. Further, such a coupler sequence may represent a plurality of engagement and adjustment combinations utilizing a plurality of couplers, generators and/or other discrete elements of the current inventive technology to generate an electrical output. This coupler sequence represents a novel and unique method (and corresponding apparatus) for generating an electrical output.

Some embodiments of the current inventive technology may include the step of sensing at least one output parameter. In some instances this step of sensing may be carried out by a sensor, or controller or other mechanical device and/or novel software/hardware solution.

As an output parameter is sensed, the current inventive technology may initiate for example a coupler sequence dependant perhaps on that output parameter. In a preferred embodiment, as wind velocity increases and perhaps crosses a pre-determine operational threshold mile per hour rate, a controller, as previously described may initiate a coupler sequence by continuum coupling at least one generator to said rotational movement element responsive to at least one output parameter at a first position. Further embodiments may include the step of continuum coupling adjusting at least one generator to said rotational movement element responsive to at least one output parameter such as an increase in wind velocity or wind energy yield.

Generally, as an output parameter such as wind velocity is increased an additional continuum coupler may continuum couple at least one additional generator to said rotational movement element responsive to at least one output parameter. As can be clearly understood, as for example an output parameter changes, such as wind velocity continuing to increase, when a certain operational threshold is met the step of continuum coupling adjusting all generators coupled to said rotational movement element responsive to at least one output parameter is effectuated. In certain embodiments this step of continuum coupling adjusting may represent for example a positional change of a continuum coupler along the coupler continuum. In some instances, consistent with the various above described embodiments, a gyrator connected to a continuum coupler may be freely adjusted to a position of lower rotational energy along the continuum. Such step of adjusting may occur in any direction along a continuum.

Still further embodiments of the current inventive technology may include the step of overlapping continuum coupling at least one additional generator to said rotational movement element responsive to at least one output parameter. Such a step of overlapping continuum coupling may in some embodiments include coupling an additional generator to a continuum in an overlapping fashion with other couplers. In some embodiments, as one additional generator is loaded onto for example a rotating platen, it may be loaded first, followed by an adjustment of each engaged coupler to a desired or pre-determined position along the continuum. Such a position may represent a position where each engaged generator is innervated at a constant RPM for example.

As can be logically understood, when for example there is a change in an output parameter such as a loss in wind velocity, a controller may initiate the step of continuum de-coupling at least one generator from said rotational movement element responsive to at least one output parameter. Such a de-coupling reduces the load on for example in some embodiments a rotating platen, allowing the rotational velocity continuum to increase. At this point each coupler that remains coupled may adjust to a desired or pre-determined position along the changed continuum. Such a position may represent a position where each engaged generator is innervated at a constant RPM for example.

Again, consistent with the above discussion, as an output parameter such as wind velocity or wind energy yield falls below a desired or pre-determined level, the inventive technology can initiate the step of continuum de-coupling all generators from said rotational movement element responsive to at least one output parameter. At this point, with all generators fully de-coupled from a rotational element no electrical output is generated. The above discussion described in general terms one embodiment of the current inventive technology's coupler sequence. Further embodiments may more specifically include the following.

Certain embodiments of the inventive technology may include the step of continuum coupling a first generator to said rotational movement element responsive to at least one output parameter. Certain embodiments may further include the step of continuum coupling a first generator to said rotational movement element at a first position. Such a first position may be pre-determined or in some instances be determined by the gradient values of the continuum used. In some embodiments a first position may be a position of substantially high rotational speed such as is found generally at the outside diameter position of said rotational movement element. As discussed previously, in this embodiment, the step of continuum coupling a first generator to said rotational movement element responsive to at least one output parameter may further result in the step of generating approximately constant generator RPM. Some embodiments may represent the step of maintaining a generator at approximately 1800 RPM.

As mentioned above, as an output parameter such as wind velocity increases it may be desired to adjust the position of a continuum coupler along a continuum to achieve and/or maintain a constant generator output or RPM. As such, certain embodiments of the current inventive technology may include the step of continuum coupling adjusting responsive to at least one output parameter. In some instances said step of continuum coupling adjusting may include the movement change of a continuum coupler along a continuum. In some embodiments, a gyrator connected to a continuum coupler may adjust or move to a different position along a rotational velocity continuum, perhaps along the face of a rotating platen for example to a position of lower rotational velocity to maintain a constant generator RPM. In some embodiments this step of continuum coupling adjusting may move a continuum coupler to a variable position. In some embodiments, said variable position may be a position along a continuum that is desired or pre-determined based on an output parameter such as generator RPM or electrical output. Some embodiments may include the step of continuum coupling adjusting said first generator to said rotational movement element at a substantially lower rotational speed position as well as the step of continuum coupling adjusting said first generator to said rotational movement element at approximately at least the inner diameter of said rotational movement element. Other certain embodiments may include the step of continuum coupling adjusting said first generator to said rotational movement element at approximately at least 4 feet from said first position.

As discussed above it may be desired to continuum couple additional generators to the system to for example increase total electrical output, manage load, maintain constant generator RPM and electrical output as well as for generator and other operational characteristic control. Therefore some embodiments may include continuum coupling at least one additional generator to said rotational movement element responsive to at least one output parameter. In some embodiments this step may occur as for example wind velocity increases. Additional embodiments may include the step of continuum coupling at least one additional generator to said rotational movement element at a first position.

As it may be desired to sequentially continuum couple additional generators in a sequential and perhaps overlapping fashion, some embodiments may include the step of continuum coupling adjusting all engaged generators to said rotational movement element responsive to at least one output parameter. In some embodiments this may include the step of all engaged continuum couplers adjusting said rotational movement element(s) at said first position responsive to at least one output parameter. Such a step of multiple generator coupling adjusting may be simultaneous or in sequence. In such an embodiment all engaged generators are now continuum coupled at a first position for example at a pre-determined or desired position along the outer diameter of a rotational element. As an output parameter, such as wind velocity increases embodiments of the current inventive technology may include the step of continuum coupling adjusting all engaged generators to said rotational movement element at a variable position responsive to at least one output parameter. Additional embodiments may include as discussed, the step of sequentially overlapping continuum coupling at least one additional generator responsive to at least one output parameter.

Such a continuum coupler sequence may be repeated and adjusted based on pre-determined operational thresholds or a desired output parameter at any given moment. As such, the entire wind power generation system may continually and dynamically initiate and adjust the continuum coupler sequence so as to achieve a continuous and fully-dynamic coupler controlled system adjustment mechanism resulting in a pre-determined and/or desired operational range and output.

As previously described, each continuum coupler may separately innervate at least one generator. Some embodiments include the step of constant generator RPM continuum coupling innervating at least one generator as well as the step of variable load continuum coupling innervating at least one generator.

Additionally, as previously described the current inventive technology may utilize at least one generator which may generate an electrical output. Some embodiments may include the step of constant generator RPM continuum coupling generating an electrical output from at least one generator as well as the step of variable load continuum coupling generating an electrical output from at least one generator.

Consistent with the above described methods and apparatus for generating an electrical output, the current inventive technology additionally generally describes the step of constant generator RPM continuum coupling outputting said electrical output in some instances to a grid. Additional embodiments may include the step of steady cycle continuum coupling outputting said electrical output where the generator Hertz cycle of the system is optimally maintained so as to allow uninterrupted and optimal outputting of an electrical output. Additional embodiments may include the step of variable load continuum coupling outputting said electrical output where in some embodiments the electrical output is outputted corresponding to the variable load utilized as previously described.

As describe previously, one of the stated goals of the current inventive technology is to generate a constant electrical and/or maintain a constant generator RPM despite fluctuations in various output parameters such as wind velocity as well as a more efficient wind power generation system with an increased generator capacity.

Further embodiments of the inventive technology may include the step of controllably rotating at least one wind responsive turbine responsive to at least one output parameter. In some instances this embodiment may include the step of rotating a hub assembly so as to increase and/or decrease wind capture yield, as well as perhaps using a braking device to cause resistance to the turbine decreasing the rotational velocity. Still further embodiments may include the step of controllably rotating at least one wind responsive blade responsive to at least one output parameter as well as the step of optimally positioning at least one wind responsive blade to controllably regulate wind yield. In certain embodiments, the step of optimally positioning may be according to a pre-determined position or based on a desired operational characteristic. In all of the above mentioned steps, each may be initiated to regulate and/or alter the characteristics of a continuum, such as increasing or decreasing the speed of a rotating platen thereby further continuum coupler controlling generator output as well as generator RPM adding an additional layer of continuum coupling control.

As an additional layer of continuum coupling control, certain embodiments may include the step of controllably generating rotational mechanical power from said step of rotating at least one wind responsive turbine and further in some cases the step of controllably gearing/coupling said rotational mechanical power from said step of rotating at least one wind responsive turbine. In some embodiments these steps allow for the manipulation of a continuum that may be coupled to a generator, so as to increase and/or decrease the speed of for example a rotating platen.

Further embodiments of this continuum coupling control, may include the step of controllably rotating at least one rotatable drive shaft as well a step of controllably rotating at least one rotatable drive shaft responsive to an at least one output parameter and/or the step of controllably differentially gearing said rotational mechanical power from said step of rotating at least one wind responsive turbine. In some embodiments the step of controllably rotating indicates controlling the rotational velocity, perhaps automatically through a controller element so as to generate an optimized or desired/pre-determined continuum.

As discussed previously, further embodiments of this continuum coupling control may include the step of controllably transferring said mechanical power to at least one rotational movement element. This embodiment may further include the step of controllably rotating at least one platen as well as controllably rotating at least one platen responsive to at least one output parameter. This embodiment may further include the step of controllably rotating at least one platen responsive to at least one output parameter selected from the group consisting of: accelerating at least one platen responsive to at least one output parameter, and decelerating at least one platen responsive to at least one output parameter. As can be plainly seen and previously discussed, such steps of controllably transferring said mechanical power, as well as the steps of controllably rotating at least one platen, may alter a continuum such as a rotational velocity continuum due to the variations in power or energy transfer and/or rotation.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the statements of invention.

As can be easily understood from the foregoing, the basic concepts of the present invention may be embodied in a variety of ways. It involves both wind power generating techniques as well as devices to accomplish the appropriate wind power generation. In this application, the wind power techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting any claims. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupler" and even a "means for coupling." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references in any information disclosure statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the wind power devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Furthermore, it should be noted that certain embodiments of the current invention may indicate a coupler, or the step of coupling. It should be noted that these may indicate a direct or in some cases an indirect connection and/or bring together of disparate or non-disparate elements in a functional, non-functional or desired configuration.

In addition and as to computer aspects and each aspect amenable to software, programming or other electronic automation, the applicant(s) should be understood to have support to claim and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A power generation coupler comprising:
    (a) at least one generator responsive to a generator drive shaft;
    (b) at least one gyrator element adjustably coupled to said generator drive shaft;
    (c) at least one non-rotational gyrator support element securing said gyrator element to at least one coupler drive shaft track spanning a rotating element such that said gyrator element is adjustable along said rotating element's surface;
    (d) at least one load engagement device responsive to a coupler controller so as to load and/or un-load said gyrator element onto the surface of said rotating element in response to at least one output parameter; and
    (e) at least one gyrator position calibrator to which said coupler drive shaft track is responsive and responsive to said coupler controller so as to dynamically adjust said gyrator element adjustably coupled to at least one generator drive shaft along the surface of said rotating element in response to at least one output parameter.

2. A power generation coupler as described in claim 1 wherein said rotating element comprises a platen.

3. A power generation coupler as described in claim 1 wherein said rotating element is rotationally powered by a force selected from the group consisting of: wind force; pressure force; water force; thermal force; steam force; kinetic force; and magnetic force.

4. A power generation coupler as described in claim 1 and further comprising a gyrator disengagement element such that said gyrator is decoupled from said generator drive shaft.

5. A power generation coupler as described in claim 1 wherein said load engagement device comprises a load engagement device selected from the group consisting of: a spring actuated load engagement device; a motorized load engagement device; a servo-motor load engagement device; a clutch load engagement device; a magnetized load engagement device; and a hydraulic load engagement device.

6. A power generation coupler as described in claim 1 wherein said coupler controller comprises at least one coupler controller responsive to a sensor.

7. A power generation coupler as described in claim 1 and further comprising at least one coupler support mount.

8. A power generation coupler as described in claim 1 wherein said generator drive shaft comprises at least one pliant generator drive shaft.

9. A power generation coupler as described in claim 1 and further comprising at least one generator drive shaft tractable connector mechanically mated with said generator drive shaft and a generator rotor.

10. A power generation coupler as described in claim 1 and further comprising at least one generator drive shaft support bearing.

11. A power generation coupler as described in claim 1 wherein said non-rotational gyrator support element comprises at least one slideable generator drive shaft engagement aperture.

12. A power generation coupler as described in claim 1 wherein said gyrator position calibrator comprises at least one gyrator position calibrator selected from the group consisting of: a slide calibrator; a rail calibrator; a magnet calibrator; a electric motor calibrator; a spring calibrator; a servo-motor calibrator; and a hydraulic calibrator.

13. A power generation coupler as described in claim 1 wherein said coupler drive shaft track comprises a bearing drive shaft track.

14. A power generation coupler as described in claim 1 and further comprising at least one generator disconnect element responsive to said coupler controller such that the resistance current applied to said generator may be dynamically adjusted.

15. A power generation coupler as described in claim 1 and further comprising at least one gyrator load adjustor.

16. A power generation coupler as described in claim 15 wherein said gyrator load adjustor comprises a gyrator load adjustor selected from the group consisting of: at least one gyrator pre-load adjustor; and at least one gyrator pre-load driver.

17. A static rotational power generation coupler comprising:
(a) at least one generator responsive to a generator drive shaft;
(b) at least one gyrator element coupled to said generator drive shaft by at least one non-rotational gyrator support element securing said gyrator element proximate to a rotating element; and
(c) at least one load engagement device responsive to a coupler controller so as to load and/or un-load said gyrator onto the surface of said rotating element in response to at least one output parameter.

18. A static rotational power generation coupler as described in claim 17 wherein said rotating element is rotationally powered by a force selected from the group consisting of: wind force; pressure force; water force; thermal force; steam force; kinetic force; and magnetic force.

19. A static rotational power generation coupler as described in claim 17 wherein said rotating element comprises a platen.

20. An electrically dynamic power generation coupler comprising:
(a) at least one generator responsive to a generator drive shaft;
(b) at least one gyrator element coupled to said generator drive shaft by at least one non-rotational gyrator support element securing said gyrator element proximate to a rotating element;
(c) at least one load engagement device responsive to a coupler controller so as to load and/or un-load said gyrator onto the surface of said rotating element in response to at least one output parameter; and
(d) at least one generator disconnect element responsive to said coupler controller such that the resistance current applied to said generator may be dynamically adjusted.

21. An electrically dynamic power generation coupler as described in claim 20 wherein said rotating element is rotationally powered by a force selected from the group consisting of: wind force; pressure force; water force; thermal force; steam force; kinetic force; and magnetic force.

22. An electrically dynamic power generation coupler as described in claim 20 wherein said rotating element is a platen.

* * * * *